(12) United States Patent
Modani et al.

(10) Patent No.: US 10,200,393 B2
(45) Date of Patent: *Feb. 5, 2019

(54) SELECTING REPRESENTATIVE METRICS DATASETS FOR EFFICIENT DETECTION OF ANOMALOUS DATA

(71) Applicant: Adobe Systems Incorporated, San Jose, CA (US)

(72) Inventors: Natwar Modani, Karnataka (IN); Gaurush Hiranandani, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,056

(22) Filed: May 29, 2018

(65) Prior Publication Data
US 2018/0278640 A1 Sep. 27, 2018

Related U.S. Application Data

(63) Continuation of application No. 15/178,403, filed on Jun. 9, 2016, now Pat. No. 10,009,363.

(51) Int. Cl.
*G06F 21/00* (2013.01)
*H04L 29/06* (2006.01)
*G06F 17/30* (2006.01)

(52) U.S. Cl.
CPC .... *H04L 63/1425* (2013.01); *G06F 17/30598* (2013.01); *G06F 17/30958* (2013.01); *H04L 63/1416* (2013.01)

(58) Field of Classification Search
CPC ............ H04L 63/1425; H04L 63/1416; G06F 17/30958; G06F 17/30598
See application file for complete search history.

(56) References Cited

U.S. PATENT DOCUMENTS 9,049,221 B1 6/2015 Yen et al.
9,202,052 B1 12/2015 Fang et al.
(Continued)

OTHER PUBLICATIONS

Notice of Allowance from related U.S. Appl. No. 15/178,403, dated Mar. 2, 2018, 27 pages.
(Continued)

*Primary Examiner* — Brandon S Hoffman
*Assistant Examiner* — William A Corum, Jr.
(74) *Attorney, Agent, or Firm* — Kilpatrick Townsend & Stockton LLP

(57) ABSTRACT

Certain embodiments involve selecting metrics that are representative of large metrics datasets and that are usable for efficiently performing anomaly detection. For example, metrics datasets are grouped into clusters based on, for each of the clusters, a similarity of data values in a respective pair of datasets from the metrics datasets. Principal component datasets are determined for the clusters. A principal component dataset for a cluster includes a linear combination of a subset of metrics datasets included in the cluster. Each representative metric is selected based on the metrics dataset having a highest contribution to a principal component dataset in the cluster into which the metrics dataset is grouped. An anomaly detection is executed in a manner that is restricted to a subset of the metrics datasets corresponding to the representative metrics.

20 Claims, 15 Drawing Sheets

(56) References Cited

U.S. PATENT DOCUMENTS

| | | | |
|---|---|---|---|
| 9,210,181 B1 | 12/2015 | Nandy et al. | |
| 10,009,363 B2* | 6/2018 | Modani | H04L 63/1425 |
| 2016/0210556 A1* | 7/2016 | Ben Simhon | G06F 11/07 |
| 2017/0228435 A1* | 8/2017 | Tacchi | G06F 17/30684 |
| 2017/0230229 A1 | 8/2017 | Sasturkar et al. | |
| 2017/0329660 A1 | 11/2017 | Salunke et al. | |
| 2017/0353477 A1* | 12/2017 | Faigon | H04L 63/1416 |

OTHER PUBLICATIONS

Bansal, et al., "Correlation Clustering", Machine Learning, 56, 89-113, 2004, 2004 Kluwer Academic Publishers. Manufactured in The Netherlands, 25 pages.

Bonchi, et al., "Overlapping Correlation Clustering", Data Mining (ICDM), 2011 IEEE 11th International Conference, pp. 51-60.

Guan, et al., "Efficient and Accurate Anomaly Identification Using Reduced Metric Space in Utility Clouds", 2012 IEEE Seventh International Conference on Networking, Architecture, and Storage, 2012 IEEE, 10 pages.

Hungarian Central Statistical Office, "About Seasonal Adjustment", downloaded from https://www.ksh.hu/docs/eng/xftp/modsz/eszezonalis_kiigazitas on Jun. 9, 2016, 5 pages.

Johnson, et al., "Applied Multivariate Statistical Analysis", Sixth Edition, Pearson Prentice Hall, Upper Saddle River, New Jersey, 2007, pp. 430-466.

Prelert Anomaly Detective® App for Splunk, "Extend the power of Splunk with Prelert's behavioral analytics platform", downloaded from http://info.prelert.com/products/anomaly-detective-app on Apr. 7, 2016, 6 pages.

Song, et al., "Feature selection using principal component analysis", 2010 International Conference on System Science, Engineering Design and Manufacturing Informatization, 2010 IEEE, 4 pages.

Tatvic, "Anomaly Detection: Stop Staring at Dashboards to monitor your business performance", downloaded from http://www.tatvic.com/anomaly-detection/ on Apr. 7, 2016, 4 pages.

United States Census Bureau, "MCD-Seasonal Adjustment Frequently Asked Questions", downloaded from http://www.census.gov/const/www/faq2.html on Apr. 4, 2016, 9 pages.

Webb, Andrew R., "Statistical Pattern Recognition", Second Edition, John Wiley & Sons, Ltd., Malvern, UK, 2002, pp. 305-357.

* cited by examiner

SELECTING REPRESENTATIVE METRICS DATASETS FOR EFFICIENT DETECTION OF ANOMALOUS DATA

CROSS-REFERENCE TO RELATED APPLICATION

This application is a continuation of U.S. patent application Ser. No. 15/178,403 that was filed on Jun. 9, 2016, allowed, the contents of which are incorporated herein by reference.

TECHNICAL FIELD

This disclosure relates generally to computer-implemented methods and systems for anomaly detection in data gathered via data networks, and more particularly relates to enabling processing devices to efficiently perform anomaly detection over large sets of metrics data to reduce processing resources (e.g., search times, processing cycles, memory requirements, etc.) required for the anomaly detection and other analytical algorithms.

BACKGROUND

When online services are used via networked computing environments, interactions with the online services generate large amounts of data that indicate various characteristics regarding the use of these online services. For example, various electronic interactions via online services (e.g., page views, website visits, webpage reloads) automatically generate data describing these actions (e.g., numbers of page views or website visits for each day of a given time period). Analysis of this data can identify issues that impact the ability of the online service to provide end-user experiences of sufficiently quality, reliability, or both.

One example of analysis that may be performed on datasets regarding online services is anomaly detection. An example of an anomaly is an outlier in a dataset that has a statistically significant deviation from a majority distribution. Anomaly detection may be performed on machine-generated event log data (e.g., network logs) to detect, for example, changes in effectiveness for a given online service (e.g., network disruptions), responsiveness of end users to certain online content, indications of malware or other suspicious activity, or any other metric indicating a performance level associated with an online service.

Current solutions for performing anomaly detection and other analysis of datasets may present disadvantages. Certain existing anomaly-detection algorithms analyze all of the metrics data generated by a given reporting tool of an online service. In some cases, this analysis involves large datasets requiring extensive processing resources. For example, metrics such as webpage visits, page views, reloads, and other metrics data may describe thousands or millions of interactions with an online service. Furthermore, the metrics data (e.g., website visits over a given time period) may be divided into additional geographic dimensions (e.g. website visits over a given time period for a first country, website visits over a given time period for a second country, etc.) or other dimensions. Increasing the number of dimensions analyzed by an anomaly-detection algorithm increases the complexity, and the required processing resources, for identifying anomalies in these metrics datasets.

With respect to these and other considerations, improvements are desirable for efficiently performing anomaly detection or other analytical algorithms over large datasets.

SUMMARY

Certain embodiments involve selecting subsets of metrics that are representative of large metrics datasets and that are usable for efficiently performing anomaly detection. As further described herein below, the embodiments allow a more efficient use of processing resources relative to existing systems. This gained efficiency improves the functionality of the computer resources by using smaller amounts of memory and processing, enabling faster data analysis, and flexibly scaling up or down the data analysis as needed. For instance, metrics datasets are grouped into clusters based on, for each of the clusters, a similarity of data values in a respective pair of datasets from the metrics datasets. Principal component datasets are determined for the clusters. A principal component dataset for a cluster includes a linear combination of a subset of metrics datasets included in the cluster. Each representative metric is selected based on the metrics dataset having a highest contribution to a principal component dataset in the cluster into which the metrics dataset is grouped. An anomaly detection is executed in a manner that is restricted to a subset of the metrics datasets corresponding to the representative metrics.

In some embodiments, a data graph is generated that represents various metrics datasets (e.g., sets of data values for a metric over a given time period). Each node in the graph represents a given metric (e.g., "page views," "website visits," etc.). Each edge represents a correlation between a given pair of metrics datasets. For instance, if a first node represents the metric "page views" and a second node represents the metric "website visits," an edge between the first and second nodes represents the degree to which page views over a given time period correlate with website visits over the same time period.

The nodes are grouped into clusters, which are used to select representative metrics. For each cluster, a principal component dataset is determined and a representative metric is selected using the principal component dataset. A principal component dataset is a linear combination of multiple metrics datasets (or modified versions of the metrics datasets) represented by nodes in a cluster. The metric whose dataset was the greatest contributor to the principal component (e.g., the most heavily weighted metric in the linear combination) is identified, and the metrics dataset for that metric is selected as the representative for the cluster. An anomaly detection is then performed on the representative metrics. The use of representative metrics datasets, rather than all of the various metrics datasets, allows the anomaly detection algorithm to focus on a smaller set of data (e.g., representative metrics), thereby increasing the efficiency with which the anomaly detection is performed.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
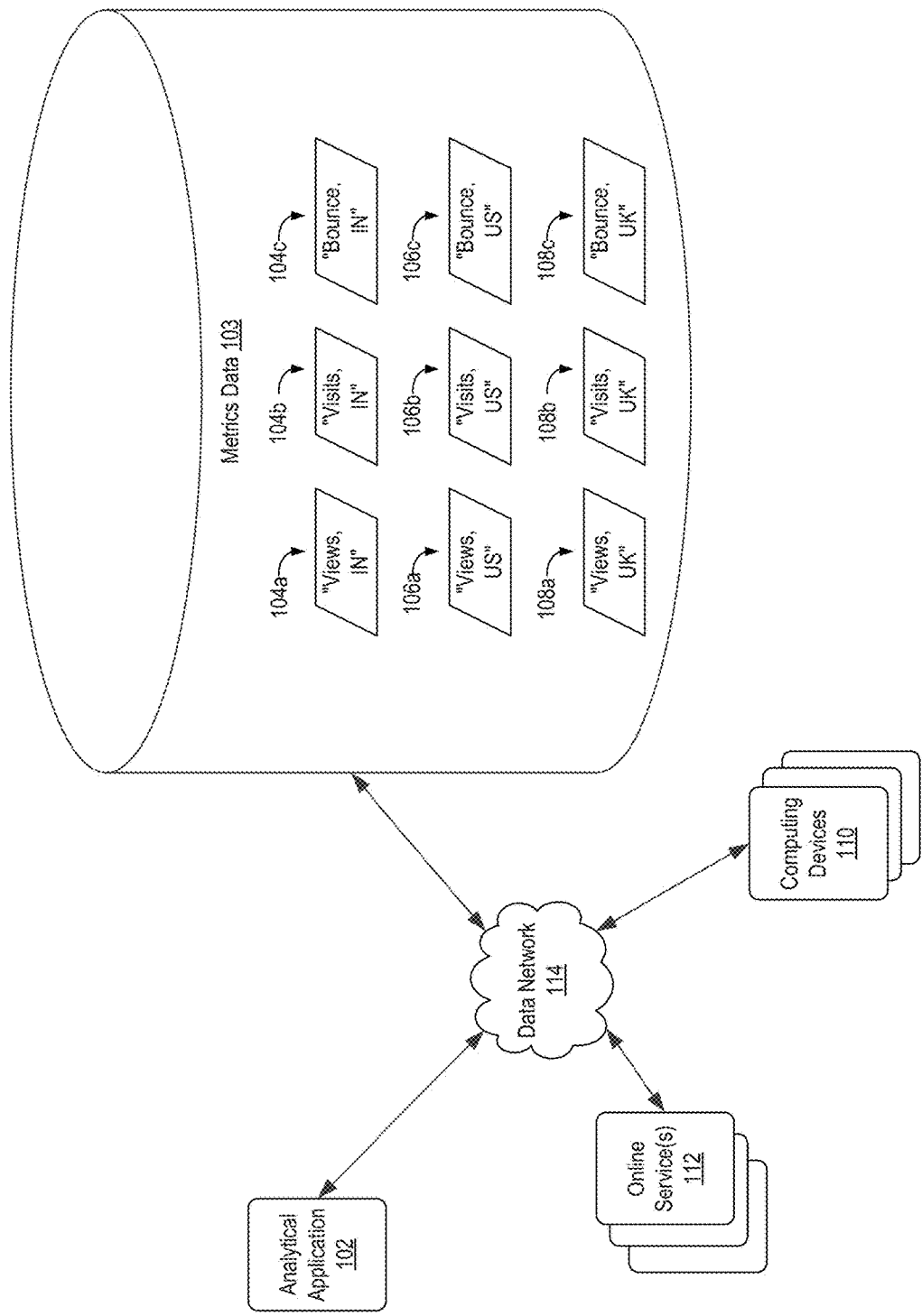
FIG. 1 illustrates an example of a computing environment in which an analytical application selects subsets of metrics that are representative of large metrics datasets and that are usable for efficiently performing anomaly detection or other analyses, according to certain embodiments.

Certain embodiments of the present disclosure include systems and methods for selecting subsets of metrics that are representative of large sets of metrics data and that are usable for efficiently performing anomaly detection or other analyses of network data. As explained above, conventional solutions for performing anomaly detection or other analyses on large metrics datasets may inefficiently utilize available processing resources. For example, existing systems, which analyze data describing different metrics for online services (e.g., webpage visits, page views, page reloads, etc.) over multiple dimensions (e.g., different regions, different applications used for accessing online services, etc.), often execute anomaly-detection algorithms using every available metric for the various dimensions. The processing of these large datasets inefficiently uses available processing resources, especially if the anomalies could be detected with the same or similar accuracy using a smaller dataset and fewer processing resources.

Certain embodiments described herein increase the efficiency with which data processing resources are allocated by reducing the amount of metrics data that must be analyzed by an anomaly-detection algorithm or other analytical algorithm. In these embodiments, a first metric, such as the number of page views in an online service, is identified as being highly correlated with a second metric and a third metric (e.g., number of website visits and revenues obtained from website visits). Based on this correlation, the dataset for the "page views" metric is selected as a representative for a group of different metrics that includes the "page views" metric, the "website visits" metric, and the "revenue" metric. A first metric is highly correlated with a second metric if, for example, data values for the first metric are proportional to the data values for the second metric. For instance, a "page views" metric is highly correlated with a "website visits" metric if the number of page views for each day of a week is consistently a multiple of the number of website visits for each day of the week. Because a representative metric is highly correlated with other metrics, performing an anomaly-detection algorithm on the representative metric (but not the other metrics) can identify anomalies for both the representative metric (e.g., page views) and its correlated metrics (e.g., website visits and revenue). These improvements result in more efficient use of processing resources, since only the data for the representative metric is used with the anomaly-detection algorithm. Increasing the efficiency typically improves the efficiency of the computer resources. In particular, the computer resources use smaller amount of memory and processing cycles to complete the data analysis. The data analysis also enables a faster detection of anomalies and can be scaled up to larger amounts of data given the memory and processing savings. In an illustrative example, for 40 metrics over a period of 30 days, the data analysis is reduced from 1,200 data points (as in existing systems) to 240 data points, representing significant memory, and processing, and time savings of about eighty percent.

The following non-limiting example is provided to introduce certain embodiments. In this example, an analytics application is used for analyzing metrics data describing the usage or performance of an online service. Examples of online services include web-based systems for providing content to end users over data networks. Examples of metrics for the online service include page views, website visits, revenue generated via the online service, and bounce rates. The metrics can be further divided by dimensions, such as geography. For example, a first metrics dataset can include page views for a first country, a second metrics dataset can include page views for a second country, a third metrics dataset can include website visits for the first country, and so on.

Continuing with this example, the analytics application uses correlations among the different metrics datasets to select certain metrics as representative metrics, over which anomaly detection or other suitable algorithms can be performed. For instance, the analytics application generates a data graph with nodes and edges. Each node in the data graph represents one of the metrics (e.g., a first node for "page views in first country," a second node for "page views in second country," a third node for "website visits in first country," etc.). Each edge connects two nodes and thereby represents a correlation between the metrics represented by the two nodes. For instance, a first metric, "page views in first country," may be correlated with a second metric, "website visits in first country," because the values of the first metric over a given time period are proportional to the values of the second metric over the same time period. An edge between a first node representing "page views in first country" and a second node representing "website visits in first country" can have a weight indicating the degree to which page views in a country are correlated with website visit in that country.

In this example, the analytics application groups nodes into clusters based on the connectivity among nodes. For instance, a cluster includes a set of nodes where each node is directly connected (i.e., without intervening nodes) to each other node in the cluster. Thus, a given cluster of nodes represents a given group of metrics datasets in which each metrics dataset in the group is correlated with each other metrics dataset in the group.

The analytics application determines principal component datasets for each cluster and uses the principal component datasets to select representative metrics. A principal component dataset, which is generated using a principal component analysis, is a linear combination of vectors corresponding to the various metrics datasets represented by the cluster. In a simplified example, if a cluster includes a "page views in first country" dataset and "website visits in first country" dataset, the two datasets can be used to generate standardized vectors (e.g., vectors in which the set of vector entries has a mean value of zero and a variance of one), and a weighted sum of these standardized vectors is used to obtain a principal component dataset. In a principal component analysis, a matrix formed from the set of standardized vectors (e.g., the vectors $X_1$ to $X_n$) is transformed into a matrix formed from a smaller set of principal component vectors (e.g., the vectors $PC_1$ to $PC_k$). Each principal component vector is a weighted combination of the vectors $X_1$ to $X_n$, where different weights are used for different principal component vectors. Through this transformation, the set of principal component vectors represents the data from the original vectors.

In some embodiments, one of the principal component vectors is selected as the principal component dataset for a given cluster, and a representative metric is identified from this principal component dataset. The most representative principal component vector is selected as the principal component dataset. For instance, in the example above, the first principal component $PC_1$ represents the largest amount of data from the original set of vectors, the second principal component $PC_2$ represents the second largest amount of data from the original set of vectors, and so on. Because the first principal component $PC_1$, which is a weighed combination of vectors corresponding to metrics in a cluster, represents the largest amount of data from those vectors, the first principal component $PC_1$ is selected for the cluster. This process is performed for each cluster. The analytics application then selects representative metrics by identifying, for each cluster, the metrics dataset having the largest contribution to the principal component dataset (e.g., the metrics dataset corresponding to the most heavily weighted vector in the linear combination that forms first principal component). The identified metrics datasets are used as the representative metrics datasets.

In some embodiments, after the representative metrics are selected, an anomaly-detection algorithm can be executed for only the representative metrics. If any representative metric is found to have anomalous data (e.g., "page views for country X"), the analytics application selects the corresponding cluster of metrics and generates a notification that other metrics datasets (e.g., "website visits for country X") potentially have anomalies. This allows informative metrics in a large metrics space to be efficiently identified.

In additional or alternative embodiments, the analytics application optimizes a data graph used for selecting representative metrics. Optimizing the data graph can, for example, increase the likelihood that sufficiently similar metrics are represented by a given cluster and decrease the likelihood that clusters of insufficient size will be created. As described in detail herein, if the metrics represented by the same cluster are sufficiently similar, a representative metric that is selected using a principal component for the cluster will have a stronger correlation (and thus be a better representative) of other metrics in the cluster. Furthermore, ensuring the clusters have a sufficient size ensures involves ensuring multiple metrics grouped into a cluster, thereby ensuring that using a representative metric succeeds in reducing processing resources (e.g., by avoiding cases where only one or two metrics is represented by a cluster and little reduction in processing resources occurs as a result of the clustering). The analytics application optimizes the data graph in an iterative manner. In a given iteration, the analytics application groups the nodes of the data graph into clusters, as described above. The analytics application calculates an output value of an objective function for the iteration. A minimum value of the objective function indicates a desirable balance between having sufficiently different clusters and having a minimum number of clusters. The analytics application then removes an edge of the data graph indicating the lowest amount of correlation between two metrics datasets, and performs a subsequent iteration. The analytics application selects, as the optimized data graph, a version of the data graph corresponding to the iteration with the minimum value of the objective function.

In some embodiments, the systems and methods described herein improve capabilities for managing, processing, and otherwise using large sets of data collected from large volumes of interactions with electronic content. For example, a large data set (e.g., data collected from hundreds or thousands of users) may have features such as high dimensionality (i.e., a large number of different features or variables, as represented by the columns of matrix X), high sparsity (i.e., absence of data for certain features, such as a "browser type"), and an unstructured format (i.e., differences in the sets of features described by messages from different user devices). These features of large data sets present difficulties when performing anomaly detection, model development, or other analyses in which trends, patterns, or other relationships are identified using large amounts of data. Extracting representative metrics datasets may reduce these computational costs by reducing smaller amounts of data for the anomaly detection or other analyses.

In some embodiments, the selection of representative metrics facilitates the use of the metrics datasets that are divided by dimensions (e.g., geography, demographics, etc.) by analytical tools that generate business insights or other analytical data. For instance, as described above, prior analytical algorithms performed on an entire metrics space may present disadvantages to dividing metrics according to dimensions, since doing so would increase the number of datasets to be processed by the analytical algorithm. But using representative metrics may decrease the costs associated with dividing metrics datasets according to dimensions, since the number of representative metrics may increase more slowly than the total number of datasets in the metrics space. Thus, using representative metrics can allow multi-dimensional data to be generated that is useful for analytical tools (e.g., tools for developing marketing insights) without presenting the disadvantages associated with analyzing a large multi-dimensional metrics space. Furthermore, the grouping of datasets that is used to identify representative metrics can provide marketers and other analyst with insights on which metrics are related to each other and affect each other.

In various embodiments, the selection of representative metrics allows for operations involving anomaly detection to be performed more efficiently, more quickly, or both. For example, one algorithm involving anomaly detection is an algorithm for identifying patterns of activity indicating defects in service quality for an online service or unauthorized use of an online service. Decreasing the amount of data required for anomaly detection via the selection of representative subsets can increase how quickly such service quality defects are remedied or authorized network access is corrected. Thus, in some embodiments, selection of representative metrics using the embodiments described herein provides more effective tools for addressing disruptions or intrusions in online services.

In one example, 40 metrics for network-related activity may be monitored over 30 days. If an anomaly detection algorithm is executed for all of the metrics, the use of 30 days worth of data for 40 metrics may result in 1200 data points (i.e., 40 metrics×30 days) to be analyzed for an anomaly detection algorithm. But if representative metrics are selected using embodiments disclosed herein, (e.g., 8 representative metrics), 240 data points (i.e., 8 metrics×30 days) rather than 1200 data points are used for an anomaly detection algorithm. Thus, a given anomaly detection algorithm that operates on each data point would be executed 240 times rather than 1200 times. If the representative metrics are sufficiently correlated with the other metrics, the 240-run execution can provide anomaly detection results that are similarly accurate and precise as compared to a 1200-run execution over the entire metrics space of 40 metrics.

Referring now to the drawings, FIG. 1 is a block diagram depicting a computing environment in which an analytical application 102 selects subsets of metrics that are representative of large metrics datasets and that are usable for efficiently performing anomaly detection or other analyses. The analytical application 102 is executed on one or more computing systems with one or more processing devices, which may (in some embodiments) be configured for distributed processing operations. The analytical application 102 accesses relevant metrics data 103 and executes suitable program code for selecting subsets of metrics that are representative of large metrics datasets.

In the example depicted in FIG. 1, the analytical application 102 accesses metrics data 103 that includes multiple metrics datasets. An example of a metrics dataset is a time series in which a set of data values for a given metrics are organized by a time period (e.g., number of page views per day over thirty days). For example, the metrics data 103 depicted in FIG. 1 includes metrics datasets 104a-c, 106a-c, 108a-c. The metrics datasets 104a-c include metrics data describing numbers of page views for an online service. The metrics datasets 106a-c include metrics data describing number of website visits for an online service. The metrics datasets 108a-c include metrics data describing bounce rates for an online service.

In some embodiments, metrics datasets are divided into certain data dimensions, such as (but not limited to) dimensions identifying geographic regions associated with online activities, dimensions identifying demographic traits associated with online activities, dimensions identifying different device types used to conduct online activities, or other suitable data dimensions. For instance, in the example depicted in FIG. 1, the "page views" metric is divided based on geographic dimensions, where the metrics dataset 104a includes page views associated with interactions originated by computing devices in India, the metrics dataset 104b includes page views associated with interactions originated by computing devices in the United States, and the metrics dataset 104c includes page views associated with interactions originated by computing devices in the United Kingdom. Likewise, the "website visits" metrics data includes a metrics dataset 106a associated with India, a metrics dataset 106b associated with the United States, and metrics dataset 106c associated with the United Kingdom. The metrics data for bounce rates and exit events is similarly organized according to geographic dimensions.

In some embodiments, the analytical application 102 processes data received from one or more online services 112, data generated from interactions with one or more online services 112 by computing devices 110, or any other data associated with one or more online services 112. The various metrics datasets in the metrics data 103 are generated from interactions by the computing devices 110 with the online services 112. The online services 112 provide applications, data, and other functions that are accessed by one or more computing devices 110 via the Internet or one or more other suitable data networks 114. Examples of the online services 112 include (but are not limited to) social media websites, websites for purchasing products or services, etc. The computing devices 110 execute respective user applications that are used to access the online services 112. Examples of the user applications include, but are not limited to, web browsers for accessing websites provided by the online services and applications specific to the online services.

In some embodiments, the analytical application 102 uses a data graph, which represents relationships among different metrics datasets, to select certain metrics as being representative of the various metrics datasets included in the metrics data 103. For instance, the analytical application 102 groups similar metrics into clusters. Two metrics are similar if they are sufficiently correlated with one another. In a simplified example, a metric x is correlated with a metric y if each value for a given time t in the metrics dataset for the metric x has a linear relationship with (e.g., is proportional to) a corresponding value for the time t in the metrics dataset for the metric y. An example of a linear relationship is $y(t)=Ax(t)+b$, where A and b are constants. The analytical application 102 then selects a representative metric for each cluster of similar metrics.

In some embodiments, the analytical application 102 uses these clusters and representative metrics to efficiently detect anomalous metrics data. For example, instead of performing an anomaly-detection algorithm for all metrics data sets, which include various dimensions of data, the analytical application 102 limits the anomaly-detection algorithm to the representative metrics. This smaller data set allows the analytical application 102 to use fewer processing resources for the anomaly-detection algorithm. Furthermore, the presence of anomalies in a representative metrics dataset indicates that similar anomalies exist in closely correlated datasets (i.e., the other metrics datasets in a cluster). Thus, a group of metrics having anomalous data can be identified efficiently for further analysis even if the anomaly-detection algorithm only used a representative metric from that group.

Figure 2:
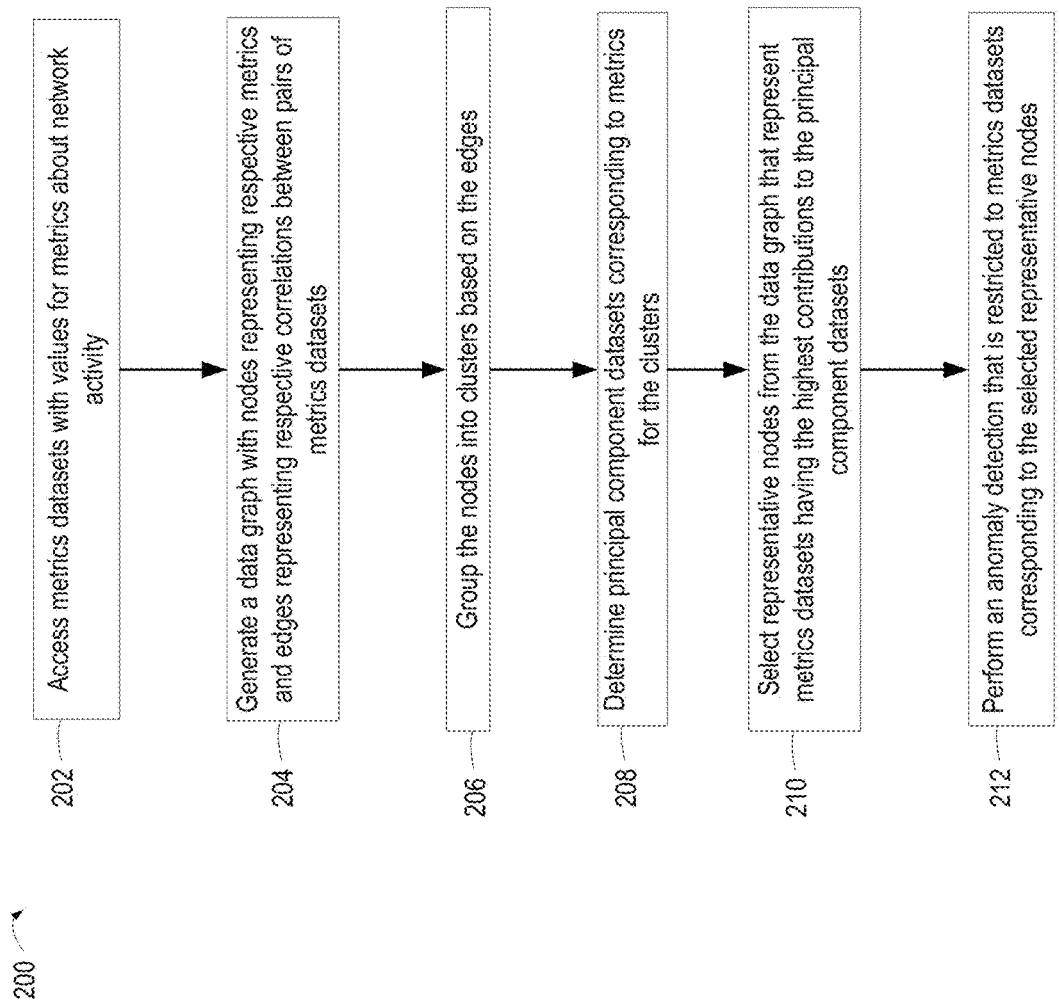
FIG. 2 illustrates an example of a method for selecting subsets of metrics that are representative of large metrics datasets and that are usable for efficiently performing anomaly detection or other analyses, according to certain embodiments.

FIG. 2 illustrates an example of a process 200 for selecting subsets of metrics that are representative of large metrics datasets and that are usable for efficiently performing anomaly detection or other analyses. In some embodiments, one or more processing devices implement operations depicted in FIG. 2 by executing suitable program code (e.g., the analytical application 102). For illustrative purposes, the process 200 is described with reference to the examples depicted in FIGS. 1 and 3-6. Other implementations, however, are possible.

At block 202, the process 200 involves accessing metrics datasets with values for metrics about network activity. For example, one or more processing devices can execute the analytical application 102 to access the metrics data 103. In some embodiments, the analytical application 102 accesses the metrics data 103 from a non-transitory computer-readable medium local to the computing system that executes the analytical application 102. In additional or alternative embodiments, the analytical application 102 accesses, via a data network 114, at least some of the metrics data 103 from a non-transitory computer-readable medium remote from the computing system that executes the analytical application 102. For example, the analytical application 102 may obtain the metrics data for n metrics that was collected over a certain time period (e.g., three months).

In some embodiments, the analytical application 102 uses a common index for the selected datasets. For example, the analytical application 102 may use metrics values with a time index. The analytical application 102 retrieves a portion of the metrics data 103 that includes data values from different metrics datasets over a common time period (e.g., 90-100 data points for each metric taken from a period of June to August on a daily scale).

At block 204, the process 200 involves generating a data graph with nodes representing respective metrics and edges representing respective correlations between pairs of metrics datasets. For example, one or more processing devices can execute the analytical application 102 to generate a data graph.

Figure 3:
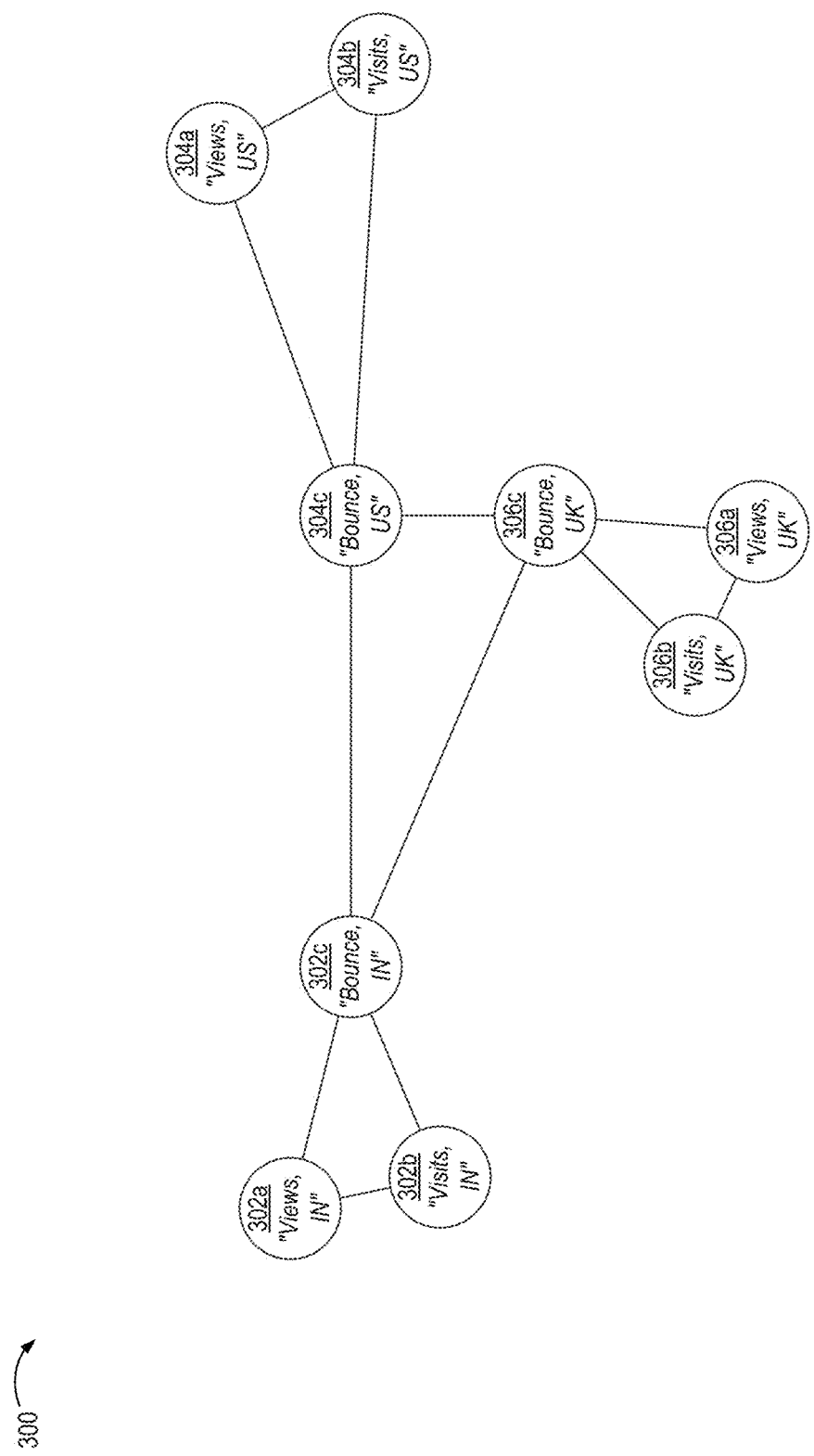
FIG. 3 illustrates an example of a data graph generated by the analytical application of FIG. 1 for selecting representative metrics in which nodes represent metrics and edges represent correlations between pairs of metrics, according to certain embodiments.

FIG. 3 illustrates an example of a data graph 300 that is generated by the analytical application 102 at block 204. In this example, which is simplified for illustrative purposes, the data graph 300 is an undirected data graph having nodes 302*a-c*, 304*a-c*, 306*a-c*. Each of the nodes represents a metrics dataset. For example, the nodes 302*a-c* respectively represent the metrics datasets 104*a-c*, the nodes 304*a-c* respectively represent the metrics datasets 106*a-c*, and the nodes 306*a-c* respectively represent the metrics datasets 106*a-c*. The nodes 302*a-c*, 304*a-c*, 306*a-c* in the data graph 300 are connected by edges. An edge between two nodes represents a correlation between the metrics datasets represented by the nodes.

The analytical application 102 or another suitable application calculates correlations among metrics. For instance, the analytical application 102 may calculate a correlation between each pair of n metrics for the time period used in block 202. Examples of suitable correlation functions include functions calculating a Pearson correlation, functions calculating a first-order temporal correlation coefficient, or any other function that identifies the degree to which the values of one metric can be accurately and consistently transformed into the values of a second metric. In some embodiments, each correlation indicates a degree to which an affine transformation accurately transforms data values from a first metrics dataset into data values from a second metrics dataset.

In some embodiments, the analytical application 102 stores the calculated correlations in a suitable data structure, such as (but not limited to) a n×n matrix. The analytical application 102 generates the graph based on the matrix. For example, if an entry in the matrix, which corresponds to a pair of metrics, has a nonzero value, the analytical application 102 generates an edge that connects the nodes representing the metrics.

In some embodiments, the analytical application 102 maintains a minimum correlation among the metrics datasets included in (i.e., represented by) the data graph. In one example, the analytical application 102 calculates correlations among the metrics datasets using a suitable correlation function. Examples of suitable correlation functions are described herein with respect to FIG. 7. The analytical application 102 selects a subset of the correlations having values that are greater than a threshold correlation (e.g., 0.8). The analytical application 102 restricts the edges used in the data graph to the selected subset of the correlations.

For instance, in the example depicted in FIG. 3, a number of webpage visits in the United Kingdom may exhibit some degree of correlation with a number of webpage visits in the United States. But if this correlation is below a threshold, the analytical application 102 excludes that correlation from the set of correlations used to generate the edges of the data graph. Thus, the resultant data graph 300 lacks an edge between the "Visits, UK" node and the "Visits, US" node.

Returning to FIG. 2, at block 206, the process 200 involves grouping the nodes into clusters based on the edges. One or more processing devices can execute the analytical application 102 to group nodes together. The grouping is performed based on the edges. In one example, the analytical application 102 identifies a set of nodes having a first node, a second node, a third node, and a fourth node. The analytical application 102 groups some of these nodes into a cluster based on edges between the nodes. For instance, if the first node is directly connected to each of the second and third nodes, and the second and third nodes are directly connected to one another, the analytical application 102 includes the first, second, and third nodes in the same cluster. If the fourth node lacks a direct connection to any of the first node, the second node, or the third node, the analytical application 102 excludes the fourth node from the cluster.

Figure 4:
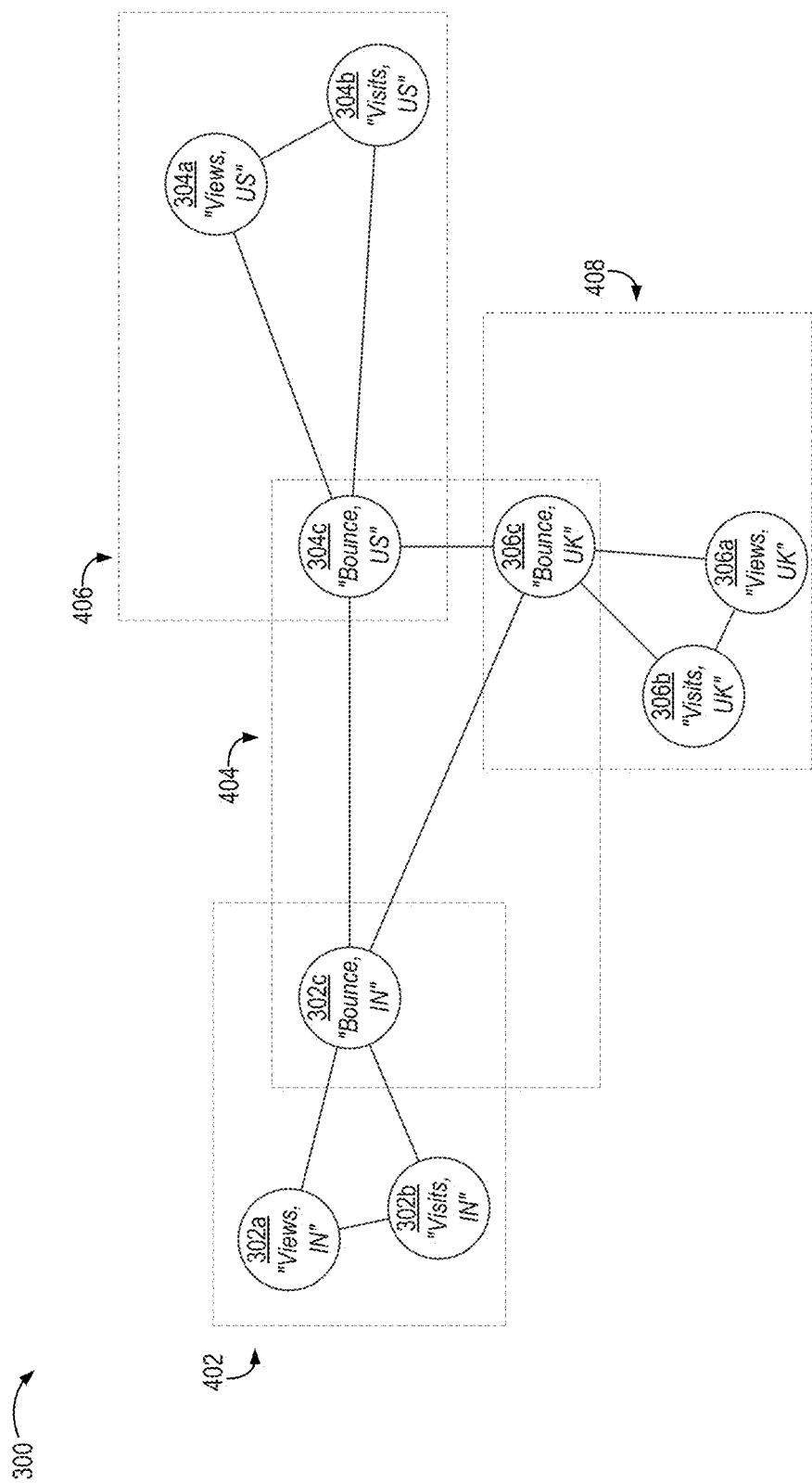
FIG. 4 illustrates an example in which nodes of the data graph of FIG. 3 are grouped into clusters based on interconnectivities among nodes, according to certain embodiments.

FIG. 4 illustrates an example of the grouping performed at block 206. In this example, the nodes 302*a-c*, 304*a-c*, 306*a-c* of the data graph 300 have been grouped into clusters 402, 404, 406, 408. A given node can be included in more than one cluster. For example, in the data graph 300, the node 302*c* is included in the clusters 402, 404. Likewise, the node 304*c* is included in the clusters 404, 406, and the node 306*c* is included in the clusters 404, 408.

In this example, each of the clusters 402, 404, 406, 408 corresponds to a respective clique in the data graph 300. A clique is a set of nodes in which each node is a neighbor to each other node in the set. A maximal clique is a clique that cannot be extended by including one more adjacent node and is therefore not a subset of a larger clique. For instance, if a set of nodes 302*a*, 302*b*, which form a clique, was extended to include the node 302*c*, the resulting set of nodes 302*a-c* would still form a clique because the node 302*c* is directly connected to each of the nodes 302a, 302b. Thus, a clique of only the nodes 302a, 302b is not a maximal clique because such a clique would be a subset of the clique having the nodes 302a-c. By contrast, if the node 306c were added to the set of nodes 302a-c, then the set of nodes 302a-c, 306c would not be a clique because the node 306c is not a neighbor of (i.e., is not directly connected to) the nodes 302a, 302b. Thus, the set of nodes 302a-c forms a maximal clique that is not a subset of any other clique.

The analytical application 102 groups the nodes 302a-c, 304a-c, 306a-c into the clusters 402, 404, 406, 408 based on the interconnectivity among the nodes creating cliques. For instance, the nodes 302a-c are interconnected such that the node 302a is directly connected to each of the nodes 302b, 302c and such that the nodes 302b, 302c are directly connected to each other. A first node is directly connected to a second node if, for example, an edge connects the first node to the second node without another node intervening between the first and second nodes. The analytical application 102 groups the nodes 302a-c into a cluster 402 based on the nodes 302a-c being connected as a clique. Likewise, the analytical application 102 groups the nodes 302c, 304c, 306c into a cluster 404 based on these nodes being connected as a clique, and also groups a clique of nodes 304a-c into a cluster 406 and a clique of nodes 306a-c into a cluster 408.

Returning to FIG. 2, at block 208, the process 200 involves determining principal component datasets corresponding to metrics for the clusters. In some embodiments, one principal component dataset (e.g., a first principal component) is determined for each cluster and acts as a descriptor for the group of metrics represented by the cluster. One or more suitable processing devices execute the analytical application 102 or other suitable program code to determine the principal component datasets. In some embodiments, a principal component dataset for a cluster includes a linear combination of metrics datasets that are represented by the cluster. For example, if each metrics dataset included in a cluster is a time series, then the principal component dataset for the cluster will also be a time series. The principal component dataset thus acts as a descriptor (or "label") for a group of metrics datasets. In some embodiments, this descriptor (i.e., the principal component dataset) is itself a metric, and has statistical properties that are usable for selecting representative metrics from the metrics data 103.

In some embodiments, at block 208, the analytical application 102 or another suitable application selects a first principal component out of multiple principal components for the metrics datasets represented by clusters. Each principal component can indicate a different amount of variance that is explained by that component for the data under consideration. For example, a first principal component explains more of the variance than a second principal component. The analytical application 102 determines and selects the first principal component as a descriptor (or "label") for a group of metrics datasets, since the first principal component explains the most variance and is therefore an adequate single descriptor for a given group.

In a simplified example, a cluster of four nodes represents a metrics dataset $m_1$, a metrics dataset $m_2$, a metrics dataset $m_3$, and a metrics dataset $m_4$. Each metrics dataset m can be considered a vector having B entries, where B is the maximum number of index values used by the analytical application 102 at block 202 and each vector entry is one of the data values in the metrics dataset m. The analytical application 102 generates vectors corresponding to the metrics datasets $m_1$, $m_2$, $m_3$, $m_4$ by standardizing the data values in the metrics datasets $m_1$, $m_2$, $m_3$, $m_4$. For example, each vector v can include vector entries having standardized metric values in which the mean of the vector values, after standardizing the metrics values, is 0 and the variance of the vector values, after standardizing the metrics values, is 1 and. (In some embodiments, these standardized versions of the metrics datasets are used in one or more of blocks 202, 204, 206, 210.) A matrix formed from these vectors $X_1$, $X_2$, $X_3$, and $X_4$ (which correspond to the metrics datasets $m_1$, $m_2$, $m_3$, $m_4$) can be transformed into a principal component matrix formed from a smaller number of principal component vectors $PC_1$ and $PC_2$. In some embodiments, the principal component vectors $PC_1$ and $PC_2$ is performed using a principal component analysis of the vectors $X_1$, $X_2$, $X_3$, and $X_4$.

Continuing with the simplified example, the principal component vectors $PC_1$ and $PC_2$ represent (to various degrees) the data in vectors $X_1$, $X_2$, $X_3$, and $X_4$. This means that a transformation of the principal component matrix (e.g., processing a combination of the principal component vectors $PC_1$ and $PC_2$) can be used to reconstruct the data in the vectors $X_1$, $X_2$, $X_3$, and $X_4$. In this principal component analysis, each of the principal component vectors is a weighted combination of the vectors $X_1$, $X_2$, $X_3$, and $X_4$, such as $PC_x = a_{k,1}X_1 + a_{k,2}X_2 + a_{k,3}X_3 + a_{k,4}X_4$. In some embodiments, a first principal component $PC_1$ is formed by determining weights $a_{1,1}$, $a_{1,2}$, $a_{1,3}$, and $a_{1,4}$ that maximize the variance of $PC_1$ and that cause a coefficient vector with entries for $a_{1,1}$, $a_{1,2}$, $a_{1,3}$, and $a_{1,4}$ to maintain a magnitude of one. The first principal component $PC_1$ explains the largest amount of variance in the data of the vectors $X_1$, $X_2$, $X_3$, and $X_4$. Thus, the first principal component $PC_1$ can be considered the most representative principal component vector with respect to the vectors $X_1$, $X_2$, $X_3$, and $X_4$ and their corresponding metrics datasets $m_1$, $m_2$, $m_3$, $m_4$.

In some embodiments, using a principal component dataset as a descriptor for a cluster can reduce or eliminate the need for assigning arbitrary descriptors to clusters (e.g., predefined labels that lack a relationship to the underlying datasets represented by the cluster). Because the principal component dataset is derived from the group of metrics datasets represented by a cluster of nodes, the principal component dataset reflects the similarities (i.e., correlations) among the metrics datasets described by the principal component dataset. For example, a principal component dataset may have statistical properties, such as correlations with other principal component datasets or contributions of different metrics to the principal component dataset, that allow for optimizing the selection of representative metrics.

Furthermore, in some embodiments, the use of a principal component dataset as a descriptor for a cluster can reduce or eliminate the need for identifying numbers of clusters in order to define or determine the number of necessary descriptors. Because the principal component dataset is derived from the group of metrics datasets represented by a cluster of nodes, using the principal component dataset as a descriptor allows for dynamic generation of these descriptors once the nodes are clustered. Furthermore, in some embodiments, the use of a principal component dataset as a descriptor for a cluster can reduce or eliminate the need for constraining the membership of a node to a single cluster.

At block 210, the process 200 involves selecting representative nodes from the data graph that represent metrics datasets having the highest contributions to the principal component datasets. One or more suitable processing devices execute the analytical application 102 or other suitable program code to identify and select the representative nodes and associated metrics.

In some embodiments, the analytical application selects a node as a representative node if the node had the highest contribution to the principal component as compared to other nodes in the cluster is selected, by the analytical application 102, as the representative node for the cluster. For instance, in the example above, four nodes can correspond to vectors $X_1$, $X_2$, $X_3$, and $X_4$ (i.e., standardized versions of the datasets for metrics $m_1$, $m_2$, $m_3$, $m_4$). In the example above, a first principal component vector $PC_1$ explains the largest amount of variance in the vectors $X_1$, $X_2$, $X_3$, and $X_4$. An example of a first principal component vector $PC_1$ is the weighted combination of $0.89X_1+0.15X_2-0.77X_3+0.51X_4$, where the weight $a_{1,1}=0.89$, the weight $a_{1,2}=0.15$, the weight $a_{1,3}=-0.77$, and the weight $a_{1,4}=0.51$. The vector $X_1$ having the coefficient with the largest magnitude (i.e., the most heavily weighted term in the combination) has the highest contribution to the principal component dataset. Thus, the analytical application 102 selects the first node (i.e., the vector $X_1$) as the representative node for the cluster, and selects the metric $m_1$ corresponding to the first node as the representative metric.

The analytical application 102 selects representative nodes for some or all of the clusters. The analytical application 102 identifies metrics datasets that correspond to the representative nodes. The analytical application 102 uses the identified metrics datasets as representative metrics datasets for certain analyses that may be performed on the metrics data (e.g., anomaly detection).

Figure 5:
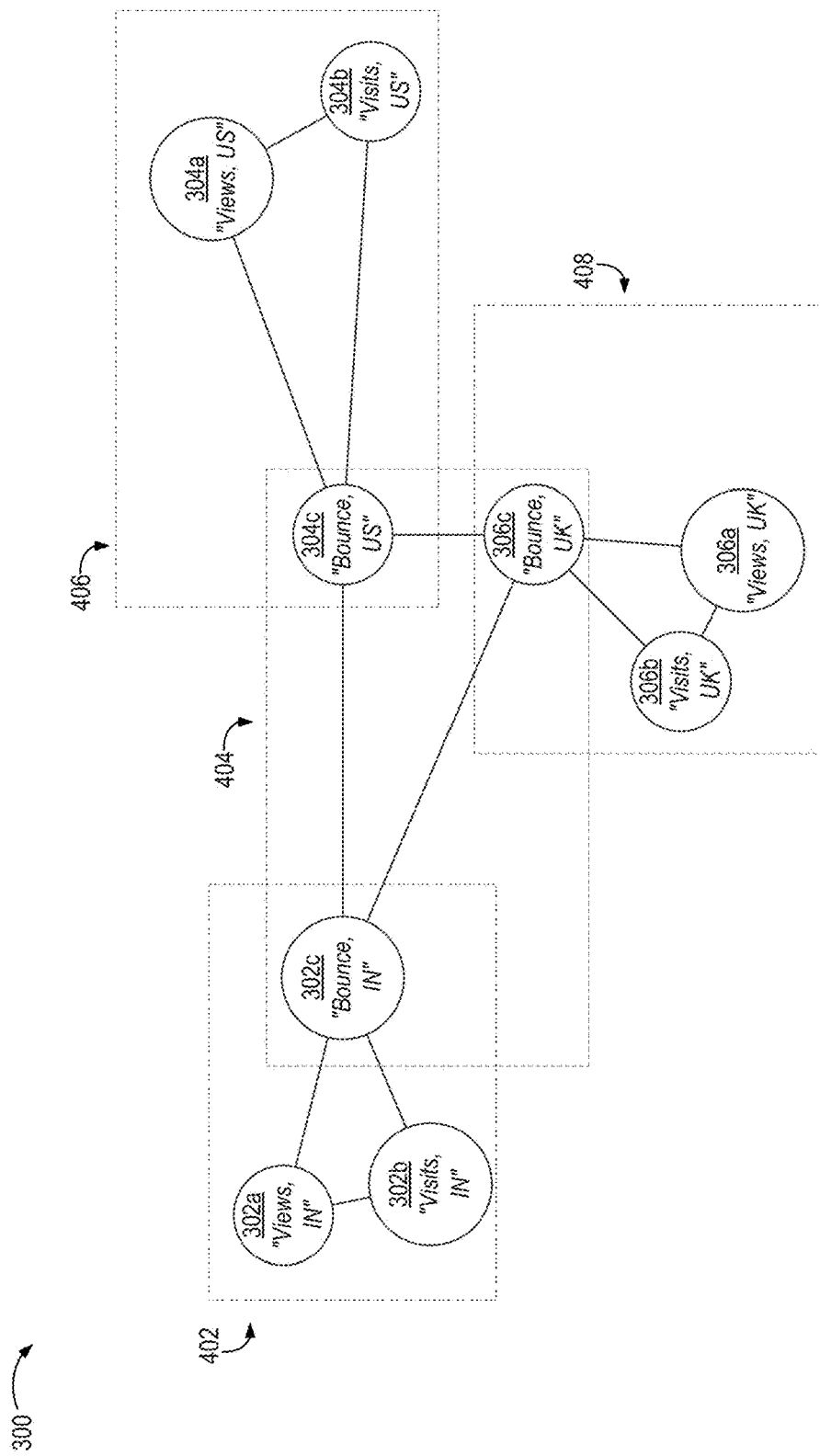
FIG. 5 illustrates an example of a data graph identifying certain nodes corresponding to representative metrics, according to certain embodiments.

FIG. 5 depicts an example of certain representative nodes being identified. In this example, the nodes 302b, 302c, 304a, 306c are identified as representative nodes. FIG. 5 illustrates the representative nodes with a larger size than other nodes in each cluster. The node 302b is identified as the representative node for the cluster 402, and the corresponding metrics dataset 104b (i.e., "Visits, India") is a representative metrics dataset for the group of metrics datasets 104a-c (i.e., "Views, India," "Visits, India," and "Bounces, India"). Likewise, the node 302c is identified as the representative node for the cluster 404, and the corresponding metrics dataset 104c is a representative metrics dataset for the group of metrics datasets 104c, 106c, 108c. Similarly, the node 304a is identified as the representative node for the cluster 406, and the node 306a is identified as the representative node for the cluster 408.

Returning to FIG. 2, at block 212, the process 200 involves performing an anomaly detection that is restricted to metrics datasets corresponding to the selected representative nodes. One or more suitable processing devices execute the analytical application 102 or other suitable program code to perform the anomaly detection. In some embodiments, performing anomaly detection or other analyses of the metrics data in a manner that is restricted to representative metrics datasets can reduce the processing resources required for the anomaly detection or other analyses. If any one of the representative metrics datasets includes an anomaly, the analytical application 102 or other suitable program code can output a suitable notification (e.g., an electronic transmission to a user device or an update to a graphical interface) indicating that representative metrics and its related metrics include anomalous data.

Figure 6:
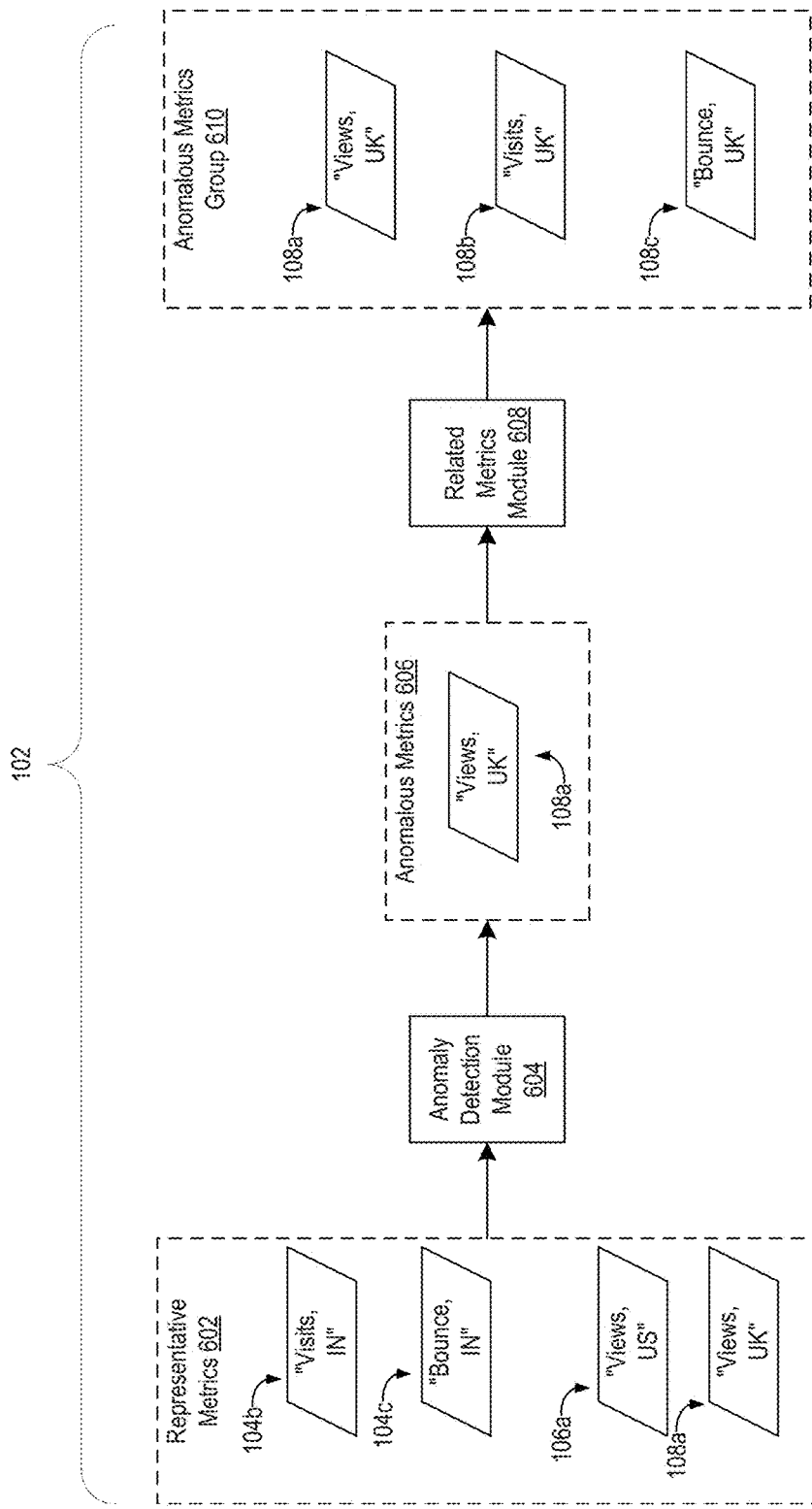
FIG. 6 illustrates an example in which representative metrics are used for efficiently detecting anomalous data and providing information about related metrics, according to certain embodiments.

FIG. 6 depicts an example of the anomaly detection performed at block 212. In this example, the analytical application 102 uses the representative metrics datasets for efficiently performing anomaly detection. The analytical application 102 provides the set of representative metrics 602 to an anomaly detection module 604 of the analytical application 102. The representative metrics 602 include the metrics datasets 104b, 104c, 106a, 108a. A processing device executes program code of the anomaly detection module 604 to determine whether any of the metrics datasets 104b, 104c, 106a, 108a includes anomalous data. The anomaly detection module 604 identifies a set of anomalous metrics 606. The set of anomalous metrics 606 includes the data set 108a.

The analytical application 102 uses the representative metrics 602 to classify other, non-representative metrics datasets in the same manner. If the anomaly detection module 604 determines that a representative metrics dataset includes non-anomalous data, then the analytical application 102 classifies related metrics datasets, which are included in the same cluster as the representative metrics dataset, as having non-anomalous data. If the anomaly detection module 604 determines that a representative metrics dataset includes anomalous data, then the analytical application 102 classifies related metrics datasets, which are included in the same cluster as the representative metrics dataset, as having anomalous data.

For instance, in the example depicted in FIG. 6, the analytical application 102 provides the data set 108a, which is identified as having anomalous data, to a related metrics module 608 of the analytical application 102. A processing device executes program code of the related metrics module 608 to identify a cluster associated with the metrics dataset 108a, such as the cluster 408 depicted in FIG. 4 that includes the node 306a, which represents the metrics dataset 108a. The related metrics module 608 identifies the other nodes in the cluster (e.g., the nodes 306, 306c in the cluster 408 depicted in FIG. 4) and identifies the corresponding metrics datasets in the cluster. In this example, the related metrics datasets are the metrics datasets 108b, 108c (e.g., "Visits, UK" and "Bounce, UK"). The related metrics module 608 thereby identifies an anomalous metrics group 610 that includes the representative metrics dataset 108a and its related metrics datasets 108b, 108c.

In additional or alternative embodiments, the analytical application 102 optimizes a data graph used for selecting representative metrics. Optimizing the data graph can, for example, increase the likelihood that principal components associated with different metrics are sufficiently different and decrease the likelihood that clusters of insufficient size will be created.

Figure 7:
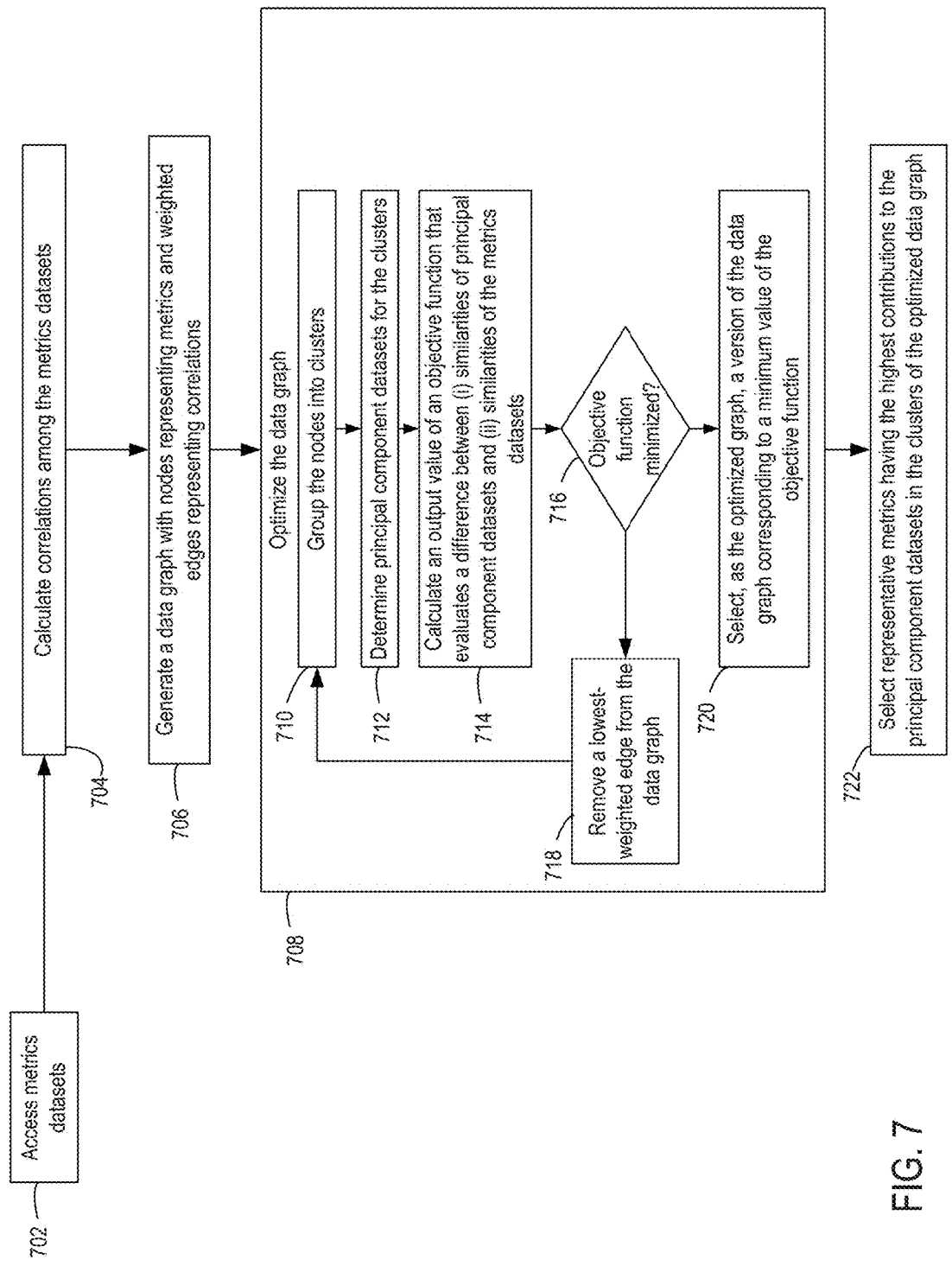
FIG. 7 illustrates an example of a method for optimizing a data graph used for selecting subsets of metrics that are representative of large metrics datasets, according to certain embodiments.

For instance, FIG. 7 illustrates an example of a process 700 for optimizing a data graph used for selecting subsets of metrics that are representative of large metrics datasets. In some embodiments, one or more processing devices implement operations depicted in FIG. 7 by executing suitable program code (e.g., the analytical application 102). For illustrative purposes, the process 700 is described with reference to the examples depicted in FIGS. 1-6 and 8-14. Other implementations, however, are possible.

At block 702, the process 700 involves accessing metrics datasets with values for metrics about network activity. For example, one or more processing devices can execute the analytical application 102 to retrieve at least some of the metrics data 103. Block 702 can be implemented in a manner similar to block 202 of process 200.

At block 704, the process 700 involves calculating correlations among the metrics datasets. One or more processing devices execute the analytical application 102 to calculate the correlations.

In some embodiments, the correlations are calculated using the Pearson correlation. For example, a n×n correlation matrix CorrData stores the values of correlations. The matrix entry at (i,j) is calculated using the following formula.

$$CorrData_{ij} = |corr(m_i, m_j)| = \left| \frac{\sum_{t=1}^{T} m_{it} m_{jt}}{\sqrt{\sum_{t=1}^{T} m_{it}^2 \sum_{t=1}^{T} m_{jt}^2}} \right|$$

This entry at (i,j) is the absolute value of the correlation between the metric $m_i$ and the metric $m_j$. The absolute values, in some embodiments, are used as edge weights in a data graph, as described herein. The correlation is calculated using the data values for the metrics datasets of the metric $m_i$ and the metric $m_j$ over a time index t having values 1 . . . T, where T is the maximum time index value in the datasets for which correlations are calculated. The use of a time index is included for illustrative purposes. In other embodiments, the time index t having values 1 . . . T may be replaced with any index b having values 1 . . . B, where B is the maximum index value in the datasets for which correlations are calculated.

Absolute values can be used if the analytical application 102 does not need to distinguish between a positive correlation (e.g., two metrics increasing together) or a negative correlation (e.g., one metric increasing and the other metric decreasing). For instance, the positive or negative correlation may not be relevant if the analytical application 102 only needs to determine whether an anomaly in one metric is accompanied by an anomaly in another metric. Absolute values can also provide similarity values between zero and one.

In additional or alternative embodiments, the correlations are calculated using a first-order temporal correlation coefficient. For example, a n×n correlation matrix CorrData stores the values of correlations. The matrix entry at (i,j) is calculated using the following formula.

$$CorrData_{ij} = |corr(m_i, m_j)| = \left| \frac{\sum_{t=1}^{T-} (m_{i(t+1)} - m_{it})(m_{j(t+1)} - m_{jt})}{\sqrt{\sum_{t=1}^{T-} (m_{i(t+1)} - m_{it})^2 \sum_{t=1}^{T-} (m_{j(t+1)} - m_{jt})^2}} \right|$$

This entry at (i,j) is the absolute value of the correlation between the metric $m_i$ and the metric $m_j$. The absolute values, in some embodiments, are used as edge weights in a data graph, as described herein. As noted above, absolute values can be used if the sign of the correlation (e.g., positive or negative) is not needed for determining similarities between datasets. The correlation is calculated using the data values for the metrics datasets of the metric $m_i$ and the metric $m_j$ over a time index t having values 1 . . . T, where T is the maximum time index value in the datasets for which correlations are calculated. The use of a time index is included for illustrative purposes. In other embodiments, the time index t having values 1 . . . T may be replaced with any index b having values 1 . . . B, where B is the maximum index value in the datasets for which correlations are calculated.

In some embodiments, the absolute value of the correlation is used because the magnitude of a correlation, rather than its direction, is relevant. For example, two metrics datasets may be "Views" (i.e., webpage views) over a time period and "Visits" (i.e., website visits) over the same time period, which have a high positive correlation. The high correlation indicates that one metrics dataset is the approximate affine transformation of the other. For example, the correlation between these metrics data sets can be 0.99. In this example, the "Views" dataset is the affine transformation of the "Visits" dataset, as indicated by the following function:

Views=$m$×Visits+$c$+$\varepsilon$.

In this function, m is the slope of the transformation, c is the intercept, and $\varepsilon$ is the error term. If the correlation of the two datasets is negative with a high magnitude (e.g., −0.99) the "Views" dataset is another affine transformation of the "Visits" dataset, as indicated by the following function:

Views=$m'$×Visits+$c'$+$\varepsilon'$.

In this function, m' is the slope of the transformation, c' is the intercept, and $\varepsilon'$ is the error term. As the absolute correlation increases, one metric being the affine transformation of the other increases (and vice versa). That is, the errors terms will decrease in the above equations if the absolute correlation increases and will increase in the above equations if the absolute correlation decreases.

In both the above mentioned cases, "Views" is the affine transformation of "Visits." If an anomaly occurs in "Views" (e.g., the value of the "Views" was higher than the expected value on a particular day), it is likely that the value of "Visits" will also have an anomaly. The anomalous value of the "Visits" metric can be higher or lower than expected, depending upon whether the "Visits" metric is positively correlated or negatively correlated with the "Views" metric. Thus, an anomaly in the "Views" metric is likely to be accompanied by an anomaly in the "Visits" metric.

At block 706, the process 700 involves generating a data graph with nodes representing metrics and weighted edges representing correlations. For example, one or more processing devices can execute the analytical application 102 to generate a data graph. Block 706 can be implemented in a manner similar to block 204 of process 200. An example of the weights of the edges is an absolute value of a calculated correlation (e.g., the Pearson correlation).

Figure 8:
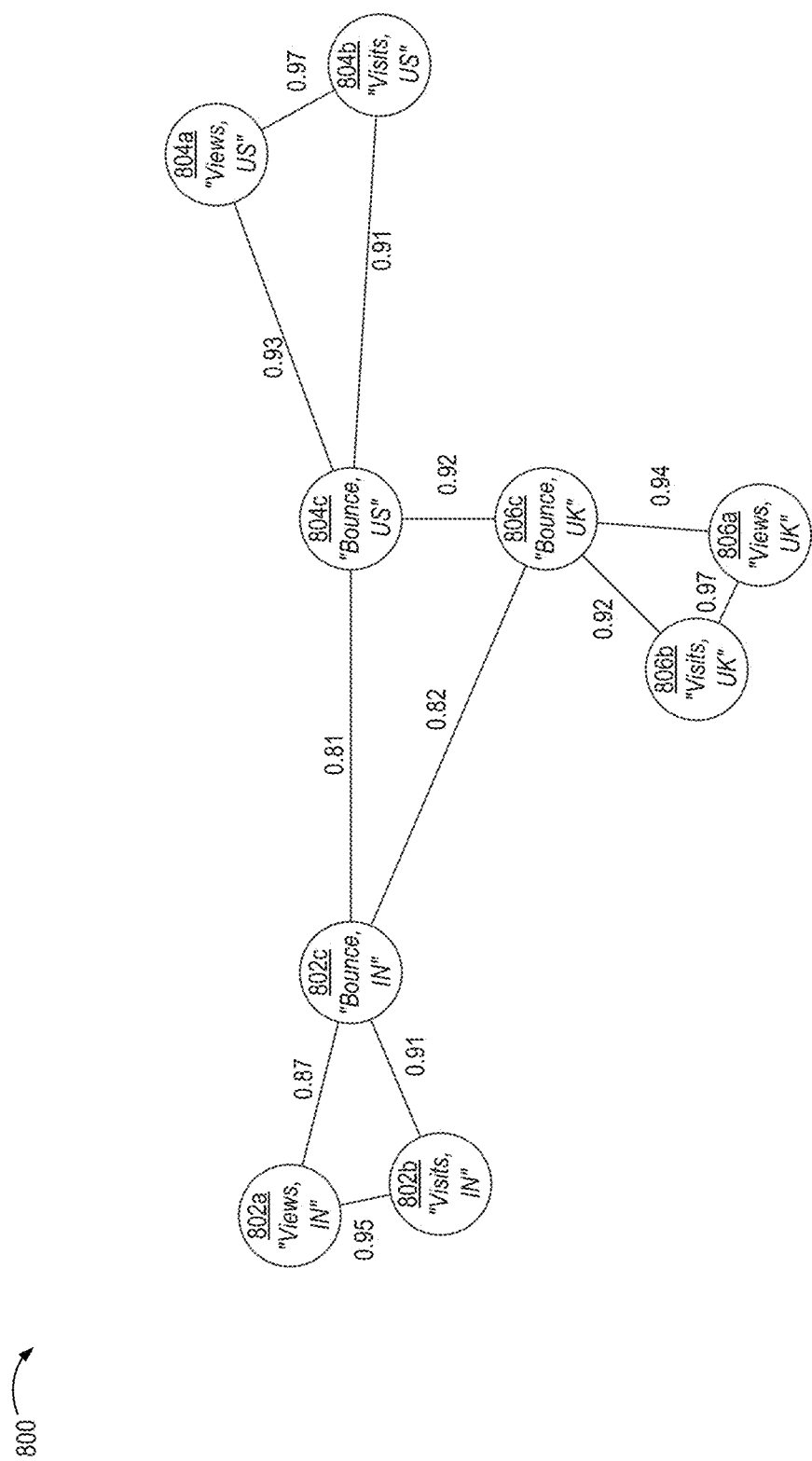
FIG. 8 illustrates an example of a data graph generated by the analytical application of FIG. 1 having edge weights representing degrees of correlation between pairs of metrics, according to certain embodiments.

FIG. 8 illustrates an example of a data graph 800 that is generated at block 706. The analytical application 102 generates the data graph 800, which includes edges with weights representing degrees of correlation between pairs of metrics. The data graph 800 includes nodes 802a-c, 804a-c, and 806a-c. Each of the nodes represents a metrics dataset. For example, the nodes 802a-c respectively represent the metrics datasets 104a-c, the nodes 804a-c respectively represent the metrics datasets 106a-c, and the nodes 806a-c respectively represent the metrics datasets 106a-c. The nodes 802a-c, 804a-c, 806a-c in the data graph 800 are connected by edges.

FIG. 8 also depicts examples of edge weights, each of which indicates a degree of correlation between two metrics datasets corresponding to the two nodes connected by the edge. For example, an edge between the node 802a and the node 802b has a weight of 0.95, an edge between the node 802b and the node 802c has a weight of 0.91, and an edge between the node 802a and the node 802c has a weight of 0.87. The higher weight of the edge between the node 802a and the node 802b, as compared to the edge connecting the node 802a and the node 802c or the edge connecting the node 802b and the node 802c, indicates that the corresponding metrics datasets 104a, 104b have a higher degree of correlation than the correlation between metrics datasets 104a, 104c or metrics datasets 104b, 104c. Other edges depicted in FIG. 8 are likewise associated with various weights.

Returning to FIG. 7, at block 708, the process 700 involves optimizing the data graph. At least one processing device executes the analytical application 102 to optimize the data graph. In some embodiments, optimizing the data graph involves modifying the data graph to include clusters having sufficiently different principal component datasets and to include a sufficient number of clusters (e.g., clusters with more than one node per cluster). The analytical application 102 iteratively executes blocks 710, 712, 714, 716, 718 to obtain an optimized graph.

At block 710, the process 700 involves grouping the nodes into clusters. Block 710 can be implemented in a manner similar to block 206 of process 200.

At block 712, the process 700 involves determining principal component datasets for the clusters. Block 712 can be implemented in a manner similar to block 208 of process 200.

At block 714, the process 700 involves calculating an output value of an objective function that evaluates differences between (i) similarities of principal component datasets and (ii) similarities of the metrics datasets. The objective function indicates differences between similarities among principal component datasets and similarities among metrics included in different clusters, where metrics included in different clusters have multiple descriptors (i.e. "labels") in the form of principal components. In some embodiments, a data graph that minimizes the output value of the objective function will include clusters having sufficiently different principal component datasets and will include a sufficient number of clusters for increasing the efficiency of anomaly detection or other analyses. An example of an objective function is provided below:

$$Obj = \sum_{u,v \in G} \frac{1}{n_u \cdot n_v} \sum_{l(u) \in L} \sum_{l(v) \in L} |H(l(u), l(v)) - s(u, v)| + \tilde{\rho}$$

In this objective function, the variables u and v represent metrics (e.g., nodes in a graph). The variables $n_u$ and $n_v$ are the number of principal component datasets (i.e., labels of various clusters) for the metric u and metric v. The variable L represents the set of principal component datasets, and the variable l represents a given principal component dataset, where l(u) and l(v) are the principal component datasets for the metric u and the metric v. The function H(.) is a similarity function between the principal component datasets of two metrics. In some embodiments, H is the absolute value of the correlation between the principal component datasets. The function s(u, v) is a similarity function between the metric u and the metric v. The similarity function can be the absolute value of the correlation between the metric u and the metric v.

The variable $\tilde{\rho}$ is a penalty term. In some embodiments, the penalty term $\tilde{\rho}$ is calculated using the following penalty function:

$$\tilde{\rho} = 2^{10 \times min(\rho)}.$$

The variable ρ is the minimum of all the correlations (edge weights) present in the graph. In additional or alternative embodiments, other monotonically increasing functions of the minimum correlation can be used as penalty function.

As indicated by the example above, in some embodiments, the objective function includes at least two terms. The first term corresponds to differences between (i) the similarities of the principal component datasets and (ii) the similarities for the metrics datasets. The second term penalizes a minimum existing similarity among the metrics datasets in the data graph.

The penalty term can be any function that increases in value as a result of the number of clusters in the data graph increases. Thus, the penalty term causes the nodes to be clustered into groups. For example, minimizing only the difference between similarities among principal component datasets and similarities among metrics datasets may prevent clustering from happening. Principal component datasets are derived from the underlying metrics datasets, and the number of principal component datasets is not constrained for each metric. Thus, if the objective function lacked the second (penalty) term, and only minimized differences between similarities among principal component datasets and similarities among metrics datasets, then the objective function would be minimized by having one node per "cluster." Because the analytical application 102 selects a representative node from each cluster, having the same number of nodes and clusters would not result in reducing the total number of metrics datasets used in an anomaly detection algorithm or other analysis. Including a penalty term in the objective function that measures the minimum existing similarity among the metrics datasets in the data graph can cause the clustering to occur.

In some embodiments, a constant multiplied by the penalty term is selected such that output values of the objective function form an approximately convex curve. A larger constant can decrease the number of cluster, and vice versa.

Figure 9:
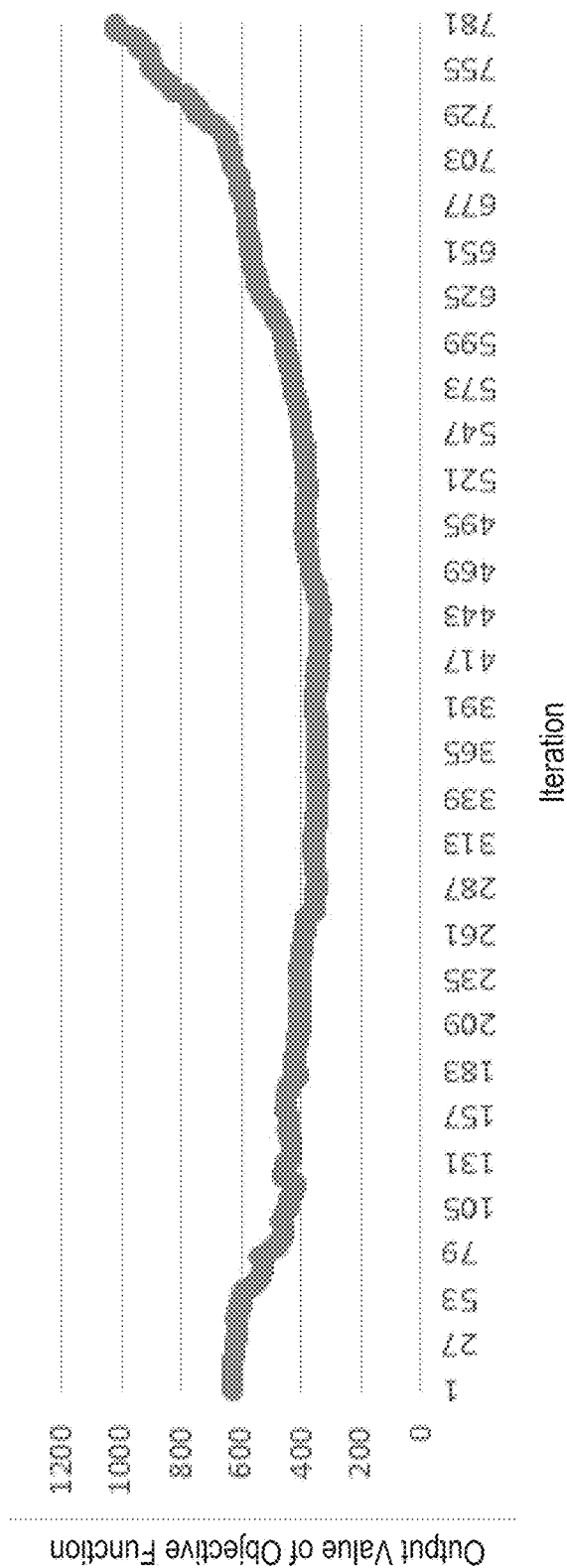
FIG. 9 illustrates an example of output values of an objective function for selecting an optimal version of the data graph from FIGS. 8-12, according to certain embodiments.

At block 716, the process 700 involves determining whether the objective function has been minimized. A processing device executes the analytical application 102 to store output values of the objective function that are calculated in respective iterations. For instance, FIG. 9 illustrates an example of output values of an objective function that are calculated. The analytical application 102 performs a sufficient number of iterations to identify a minimum value in a curve defined by the various output values. In some embodiments, a sufficient number of iterations is used that depends on the number of metrics under consideration. For an example involving n metrics, a sufficient number of iterations can be (n×(n−1))/2+1 iterations, where (n×(n−1))/2 is the number of edges present in the data graph before the removal of edges. In the example depicted in FIG. 9, the analytical application 102 determines that a minimum value occurs at iteration 365.

If the objective function has not been minimized, the process 700 involves block 718, in which a lowest-weighted edge is removed from the data graph. The analytical application 102 removes the lowest-weighted edge from the graph and returns the process 700 to block 710.

Figure 10:
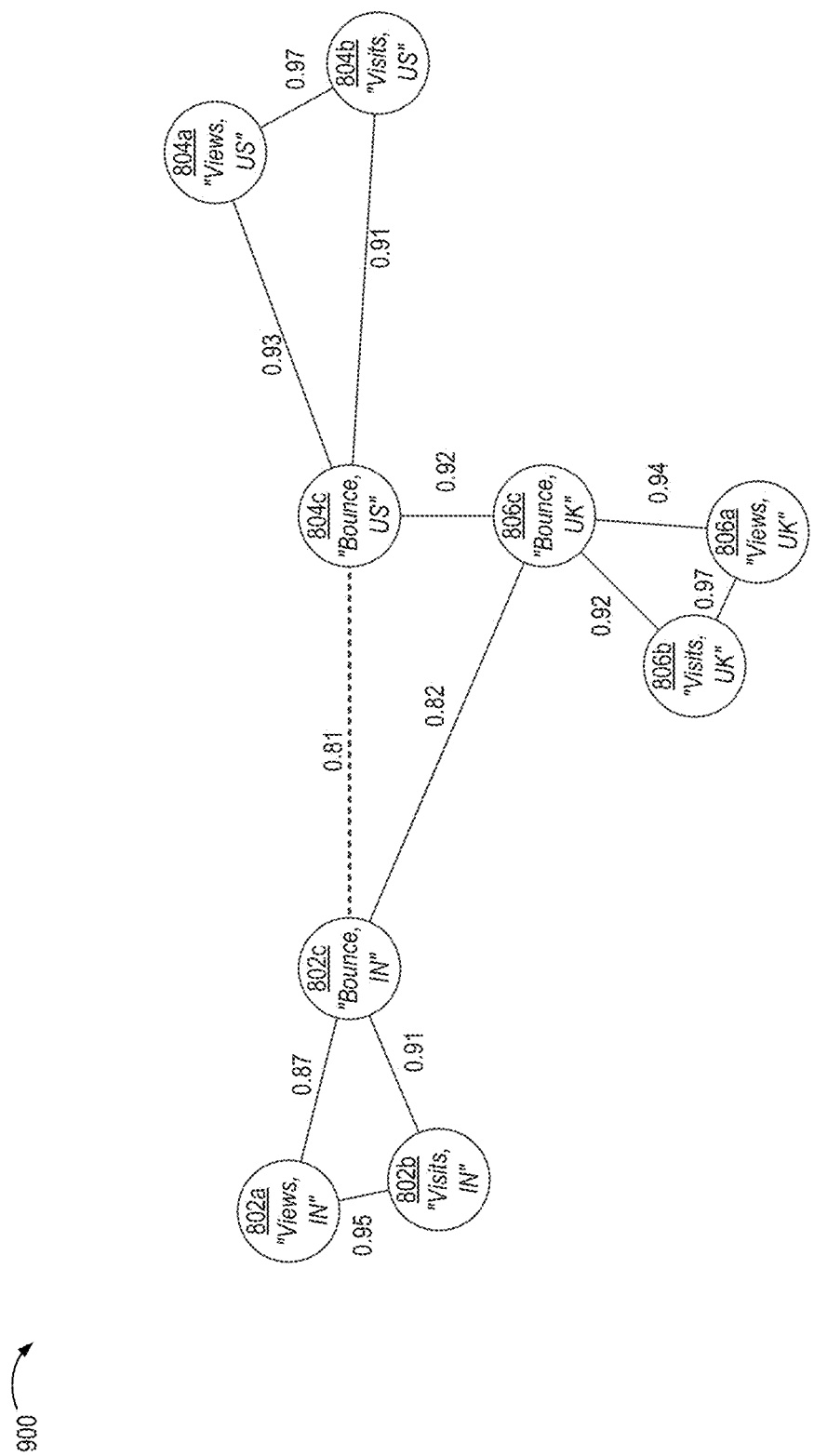
FIG. 10 illustrates an example of a modified version of the data graph of FIG. 8 in which an edge indicating a lowest amount of correlation has been removed, according to certain embodiments.
Figure 11:
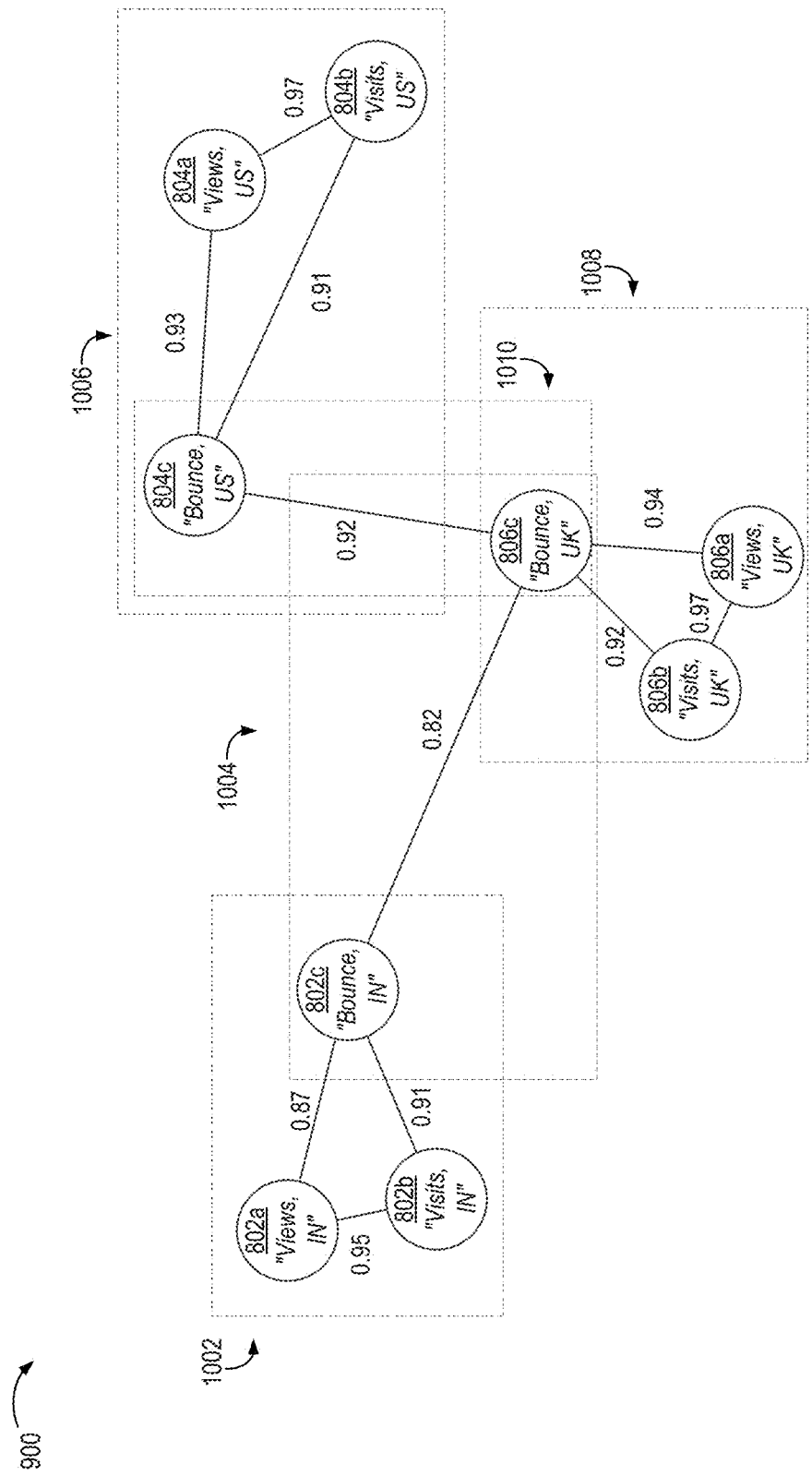
FIG. 11 illustrates an example in which nodes of the data graph of FIG. 10 are grouped into clusters based on the updated interconnectivities following the removal of the lowest-correlation edge, according to certain embodiments.

For instance, FIG. 10 illustrates an example of a data graph 900, which is a modified version of the data graph 800. In the data graph 900, an edge with a weight indicating a lowest amount of correlation in the graph (e.g., the weight 0.81) is removed, as indicated by the dotted line between the nodes 802c, 804c depicted in FIG. 10. FIG. 11 illustrates an example in which nodes 802a-c, 804a-c, and 806a-c of the data graph 900 are grouped into updated clusters 1002, 1004, 1006, 1008. The grouping is performed based on the updated interconnectivities following the removal of the lowest-correlation edge. For example, the nodes 802c, 804c, 806c no longer form a clique following the removal of the edge between the nodes 802c, 804c. The cluster 1004 therefore includes the nodes 802c, 806c, which form a maximal clique, and is different from a cluster of nodes 802c, 804c, 806c from a previous iteration.

Figure 12:
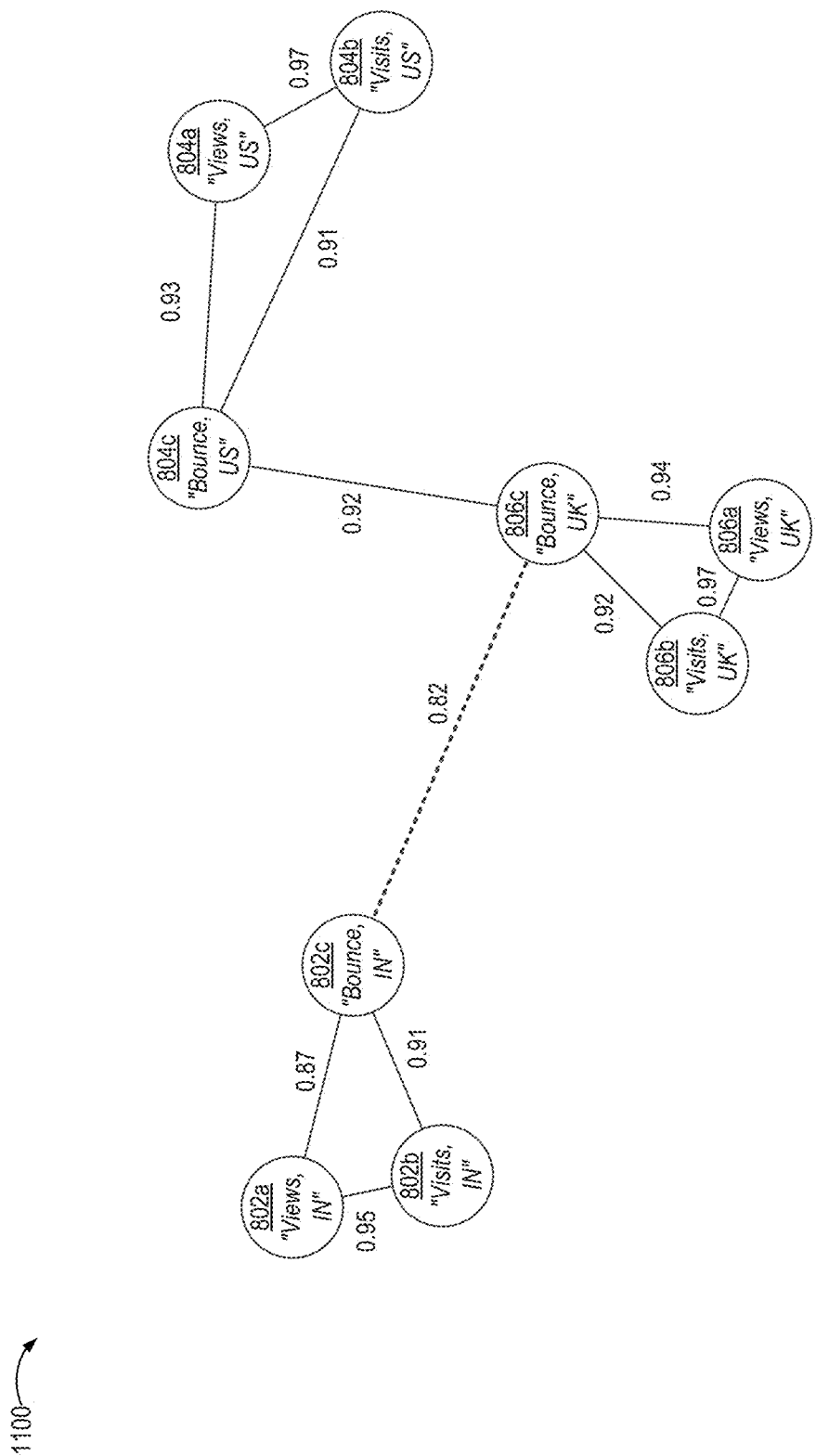
FIG. 12 illustrates an example of a modified version of the data graph depicted in FIG. 10 in which another edge indicating a lowest amount of correlation among the remaining nodes has been removed, according to certain embodiments.
Figure 13:
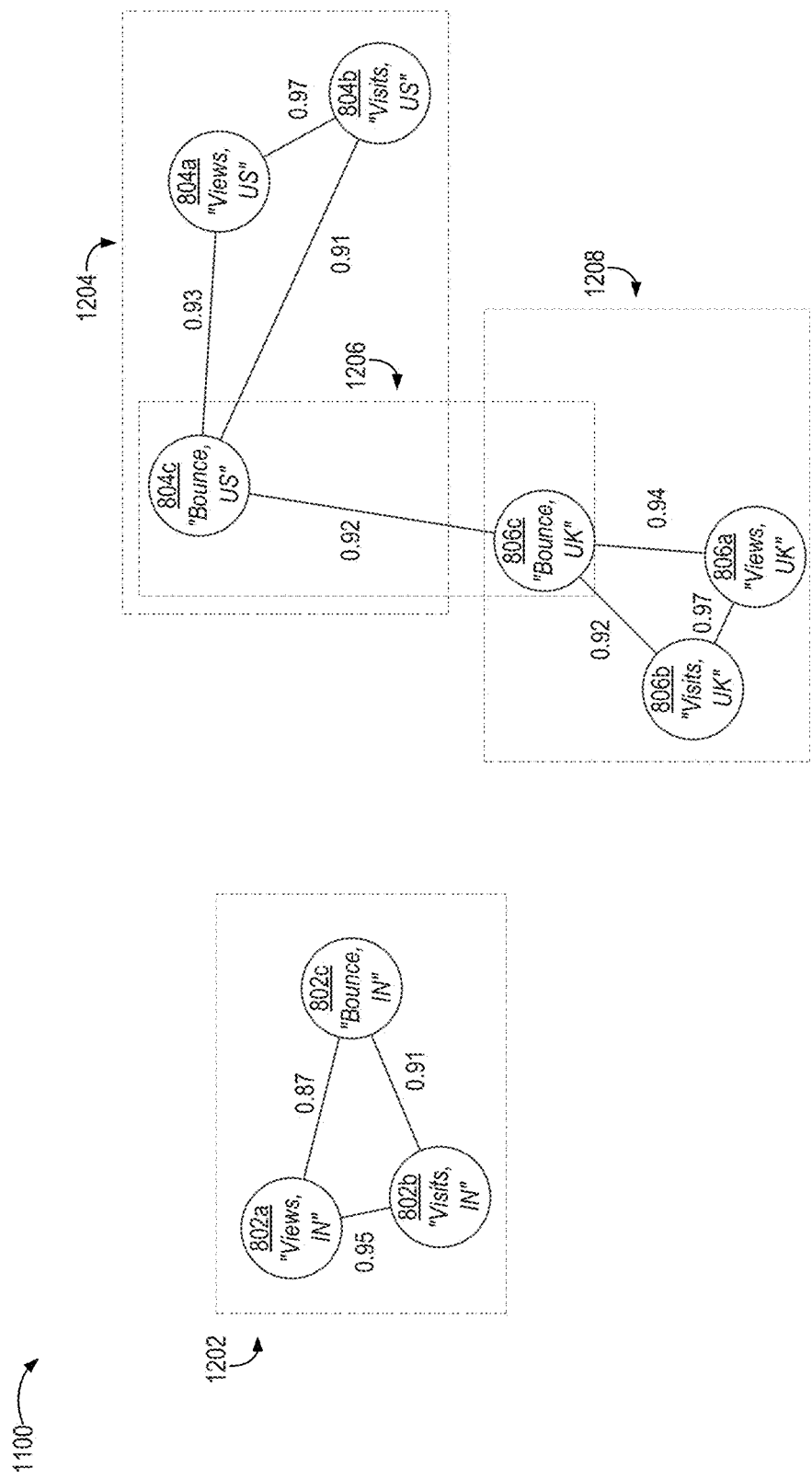
FIG. 13 illustrates an example in which nodes of the data graph depicted in FIG. 12 are grouped into clusters based on the updated interconnectivities following the removal of the lowest-correlation edge, according to certain embodiments.

As the process 700 iterates, additional edges are removed and new groupings of nodes are performed. For example, FIG. 12 illustrates an example of a data graph 1100 that is a modified version of the data graph 900 depicted in FIG. 10. In data graph 1100, an edge with a weight indicating a lowest amount of correlation in the graph (e.g., the weight 0.82) is removed, as indicated by the dotted line between the nodes 802c, 806c depicted in FIG. 12. Likewise, FIG. 13 illustrates an example in which nodes of the data graph 1100 are grouped into clusters 1202, 1204, 1206, 1208 based on the edge removal depicted in FIG. 12. In this example, the node 802c only belongs to one cluster 1202, rather than the two clusters 1002, 1004 depicted in FIG. 11. This change in cluster membership results from the edge removal depicted in FIG. 12.

The iterative portion of process 700 can iterate a sufficient number of times to identify a minimum value of the objective function. In some embodiments, the iterative portion can be iterated until no edges are remaining in the data graph. In other embodiments, the iterative portion can be iterated fewer times.

Returning to FIG. 7, if the objective function has been minimized, the process 700 involves block 720, in which a version of the data graph corresponding to a minimum value of the objective function is selected as the optimized graph. A processing device executes the analytical application 102 to select a version of the data graph. For example, in each iteration, the analytical application 102 stores, in a non-transitory computer-readable medium, a version of the data graph (e.g., a matrix corresponding to the data graph) and a calculated output value of the objective function. At block 720, the analytical application 102 retrieves the version of the data graph that corresponds to the stored output value that is the minimum value of the objective function for the various iterations.

Returning to FIG. 7, at block 722, the process 700 involves selecting representative metrics having the highest contributions to the principal component datasets in the clusters of the optimized data graph. Block 722 can be implemented in a manner similar to block 210 of process 200.

Figure 14:
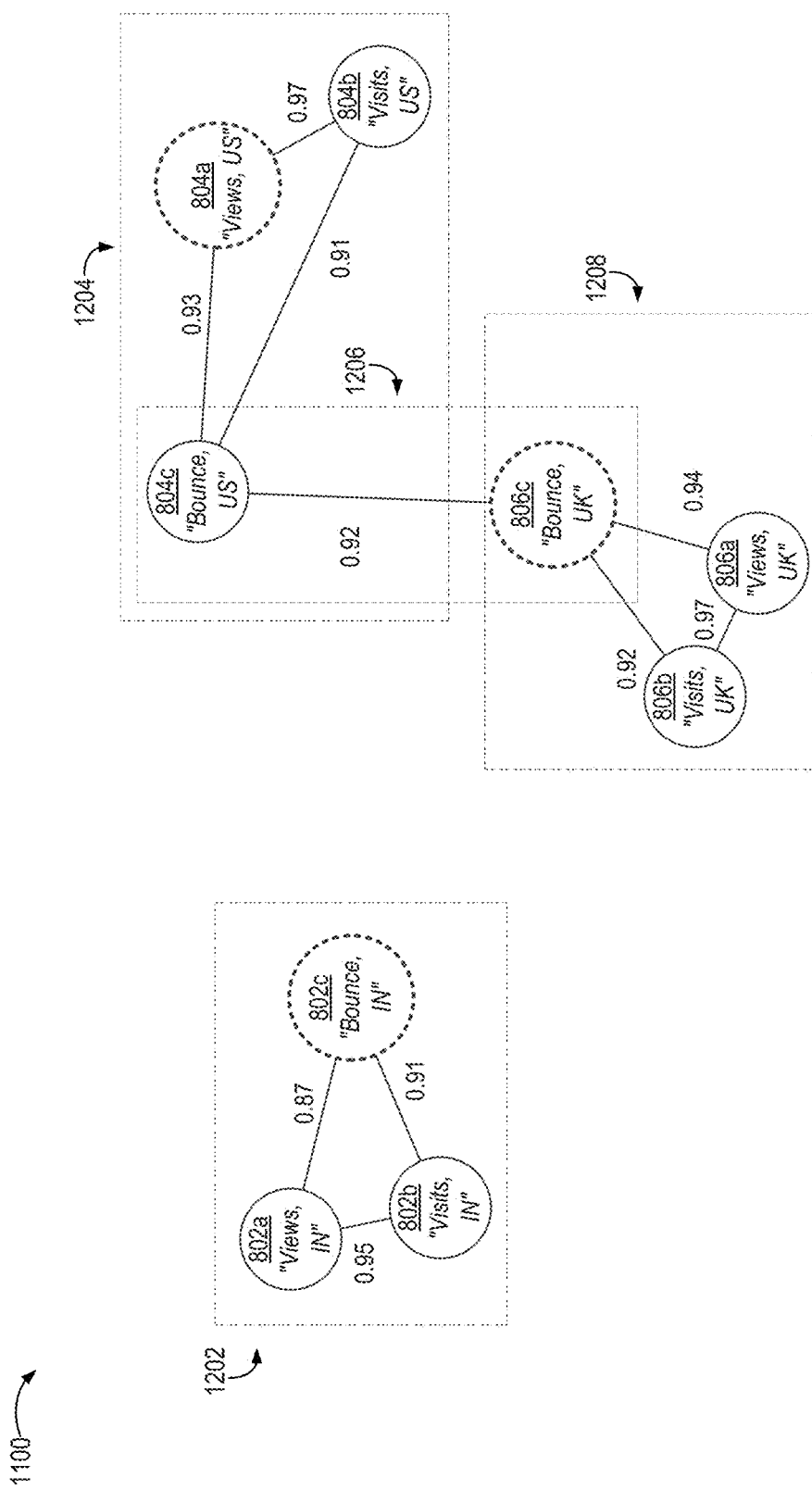
FIG. 14 illustrates an example of an optimized data graph in which certain nodes corresponding to representative metrics are indicated, according to certain embodiments.

FIG. 14 illustrates an example of an optimized data graph 1100 in which certain nodes corresponding to representative metrics are indicated. In this example, the nodes 802c, 806c are identified as representative nodes. FIG. 14 illustrates the representative nodes with a larger size and having a dotted outline as compared to other nodes in each cluster. The node 802c is identified as the representative node for the cluster 1202, and the corresponding metrics dataset 104c (i.e., "Visits, India") is a representative metrics dataset for the group of metrics datasets 104a-c (i.e., "Views, India," "Visits, India," and "Bounces, India"). Likewise, the node 806c is identified as the representative node for the cluster 1206, and is also identified as the representative node for the cluster 1208. Thus, corresponding metrics dataset 108c is a representative metrics dataset for a first group of metrics datasets 104c, 106c, 108c (represented by the nodes 806a-c) and a second group of metrics datasets 106c, 108c (represented by the nodes 804c, 806c). Similarly, the node 804a is identified as the representative node for the cluster 1204.

In some embodiments, the examples described above can involve strong notion of equivalence in a time series or other metrics data set, such that metrics that are equivalent will be assigned to the same cluster. For instance, in an Equivalence Theoretic approach, the relation "~" is said to be an equivalence relation if (1) a reflexive property exists, where a~a (i.e., a is related to a); (2) a symmetric property exists, where if a~b, then b~a (i.e., b is related to a); and (3) a transitive property exists, where if a~b and b~c (i.e., a is related to b and b is related to c), then a~c (i.e., a is related to c). This Equivalence Theoretic approach can permit the implementation of the embodiments described herein. For example, if an undirected graph is created by defining symmetric similarities between vertices (i.e., nodes), which allows size-1 loops as well, and maximal cliques in the graph are identified, then the maximal cliques forms the set of equivalence classes (i.e., clusters of nodes). In a clique, all the above equivalence theoretic properties will hold and thus, a strong notion of equivalence can be realized.

Figure 15:
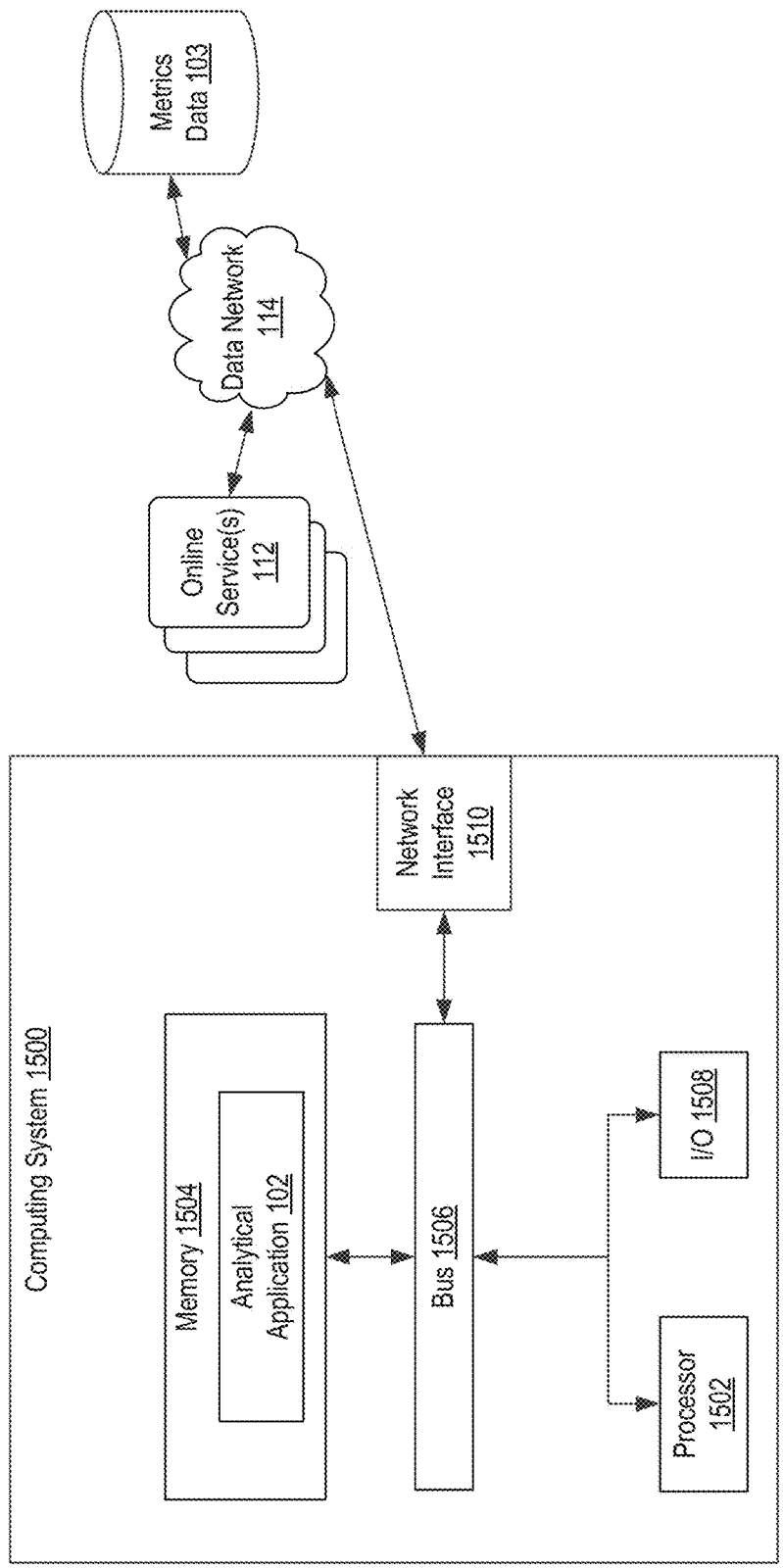
FIG. 15 illustrates an example of a computing system that executes an analytical application for selecting subsets of metrics that are representative of large metrics datasets, according to certain embodiments.

Any suitable computing system or group of computing systems can be used for performing the operations described herein. For example, FIG. 15 illustrates an example of a computing system 1500 that executes the analytical application 102 for selecting subsets of metrics that are representative of large metrics datasets.

The depicted example of the computing system 1500 includes one or more processors 1502 communicatively coupled to one or more memory devices 1504. The processor 1502 executes computer-executable program code stored in the memory device 1504, accesses information stored in the memory device 1504, or both. Examples of the processor 1502 include a microprocessor, an application-specific integrated circuit ("ASIC"), a field-programmable gate array ("FPGA"), or any other suitable processing device. The processor 1502 can include any number of processing devices, including one.

The memory device 1504 includes any suitable non-transitory computer-readable medium for storing the analytical application 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1500 may also include a number of external or internal devices such as input or output devices. For example, the computing system 1500 is shown with an input/output ("I/O") interface 1508 that can receive input from input devices or provide output to output devices. A bus 1506 can also be included in the computing system 1500. The bus 1506 can communicatively couple one or more components of the computing system 1500.

The computing system 1500 executes program code that configures the processor 1502 to perform one or more of the operations described above with respect to FIGS. 1-14. The program code includes, for example, the analytical application 102 or other suitable applications that perform one or more operations described herein. The program code may be resident in the memory device 1504 or any suitable computer-readable medium and may be executed by the processor 1502 or any other suitable processor. In some embodiments, the program code described above is stored in the memory device 1504, as depicted in FIG. 15. In additional or alternative embodiments, the program code described above is stored in one or more memory devices accessible via a data network.

The computing system 1500 can access the metrics data 103 in any suitable manner. In some embodiments, the metrics data 103 is stored in one or more memory devices accessible via a data network 114, as in the example depicted in FIG. 15. In additional or alternative embodiments, some or all of the metrics data 103 is stored in the memory device 1504.

The computing system 1500 depicted in FIG. 15 also includes at least one network interface 1510. The network interface 1510 includes any device or group of devices suitable for establishing a wired or wireless data connection to one or more data networks 114. Non-limiting examples of the network interface 1510 include an Ethernet network adapter, a modem, and/or the like. The computing system 1500 is able to communicate with one or more online services 112 using the network interface 1510.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for selecting representative metrics from which anomalous metrics data can be efficiently determined, the method comprising:
   accessing metrics datasets, wherein each metrics dataset includes data values for a respective metric indicating activity over a data network;
   grouping, by a processing device, the metrics datasets into clusters based on, for each of the clusters, a similarity of data values in a respective pair of datasets from the metrics datasets;
   determining, by the processing device, principal component datasets for the clusters, wherein, for each cluster, each principal component dataset comprises a linear combination of a respective subset of the metrics datasets;
   selecting, by the processing device, representative metrics based on, for each representative metric, a corresponding one of the metrics datasets having a highest contribution to one of the principal component datasets; and
   executing, by the processing device, an anomaly detection that is restricted to a subset of the metrics datasets corresponding to the representative metrics.

2. The method of claim 1, further comprising:
   generating a data graph comprising nodes and edges, wherein each node represents a respective metric from one of the metrics datasets, wherein each edge represents a respective correlation indicating a similarity of data values in a respective pair of the metrics datasets, wherein grouping the metrics datasets into clusters comprises grouping the nodes into the clusters based on the edges, wherein each principal component dataset corresponds to a respective one of the clusters of nodes;
   optimizing the data graph, wherein optimizing the data graph comprises:
      iteratively performing operations comprising:
         modifying the data graph by removing, from the data graph, an edge having a lowest correlation value among correlation values in the data graph,
         grouping the nodes into modified clusters based on the modified graph,
         determining modified principal component datasets for the modified clusters, wherein each modified principal component dataset is a linear combination of a respective subset of the metrics datasets that are represented by a respective subset of the nodes included in a respective modified cluster, calculating an output value of an objective function having a first term corresponding to a difference between (i) similarities among principal component datasets and (ii) similarities among metric datasets, the objective function also having a second term corresponding to similarities among the metrics represented in the modified graph, and selecting, as the optimized data graph, a version of the data graph corresponding to a minimum value of the objective function obtained from the iteratively performed operations;

identifying principal component datasets from the optimized data graph; and wherein the representative metrics are each selected by selecting, for each identified principal component dataset, a respective metrics dataset having a respective highest contribution to the identified principal component dataset.

3. The method of claim 2, wherein a value of the first term increases in response to increases in the difference between the similarities among principal component datasets and the similarities among metric datasets, wherein a value of the second term increases in response to the similarities among the metrics represented in the modified graph.

4. The method of claim 3, wherein the second term corresponds to a minimum of calculated correlations represented by edges in the modified graph.

5. The method of claim 2, wherein generating the data graph comprises maintaining a minimum correlation among the metrics datasets included in the data graph, wherein maintaining the minimum correlation comprises:

calculating correlations among the metrics datasets, wherein each correlation indicates a degree to which an affine transformation accurately transforms data values from a first respective metrics dataset into data values from a second respective metrics dataset;

selecting a subset of the correlations greater than a threshold correlation; and restricting the edges used in the data graph to the selected subset of the correlations.

6. The method of claim 2, wherein grouping the nodes into the clusters based on the edges comprises:

identifying a first node, a second node, a third node, and a fourth node and a set of edges among the first node, the second node, the third node, and the fourth node;

including the first node in one of the one of the clusters;

including the second node in the one of the clusters based on the second node being directly connected to the first node via the set of edges and the second node being directly connected to the third node via the set of edges;

including the third node in the one of the clusters based on the third node being directly connected to the first node via the set of edges and the third node being directly connected to the second node via the set of edges; and excluding the fourth node from the one of the clusters based on the fourth node lacking a direct connection via the set of edges to at least one of the first node, the second node, or the third node.

7. The method of claim 1, further comprising:

determining that a representative metrics dataset includes anomalous data;

identifying an additional metrics dataset that is grouped with the representative metrics dataset having the anomalous data; and outputting an indicator that additional anomalous data is included in the additional metrics dataset.

8. A method for selecting metrics from which anomalous metrics data can be efficiently determined, wherein the method include one or more processing devices performing operations comprising:

accessing metrics datasets, wherein each metrics dataset includes data values for a metric indicating activity over a data network;

generating a data graph comprising nodes and edges with weights, wherein each node represents a respective metric, wherein each weight represents a correlation between a pair of respective metrics datasets;

optimizing the data graph by at least:

iteratively performing operations comprising:

grouping the nodes into clusters based on the edges, determining principal component datasets for the clusters, wherein, for each cluster, each principal component dataset comprises a linear combination of a respective subset of the metrics datasets, calculating an output value of an objective function based on similarities among principal component datasets, similarities among metric datasets, and similarities among the metrics represented in the data graph, and removing, for a subsequent iteration an edge from the data graph having a lowest weight, and selecting a version of the data graph as the optimized data graph based on the version of the data graph corresponding to a minimum value of the objective function; and selecting a representative subset of the metrics based on each metrics dataset in the representative subset of the metrics having a highest contribution to a respective principal component dataset for a respective cluster of the optimized data graph.

9. The method of claim 8, the operations further comprising:

performing an anomaly detection based on the selected representative subset of the metrics, wherein performing the anomaly detection comprises restricting the anomaly detection to metrics datasets included in the representative subset of the metrics;

determining, from the anomaly detection, that anomalous data is included in one of the metrics datasets from the representative subset of the metrics;

identifying, from the data graph, additional nodes from one of the clusters that includes the one of the metrics datasets having the anomalous data; and outputting an indicator that additional anomalous data is included in additional metrics datasets respectively corresponding to the identified additional nodes.

10. The method of claim 8, wherein the objective function has a first term and a second term, wherein the first term corresponds to the similarities among principal component datasets and the similarities among metric datasets, wherein the second term corresponds to the similarities among the metrics represented in the data graph, wherein a value of the first term increases in response to increases in a difference between the similarities among principal component datasets and the similarities among metric datasets, wherein a value of the second term increases in response to the similarities among the metrics represented in the data graph.

11. The method of claim 10, wherein the second term corresponds to a minimum of calculated correlations represented by edges in the data graph.

12. The method of claim 8, wherein generating the data graph comprises maintaining a minimum correlation among the metrics datasets included in the data graph, wherein maintaining the minimum correlation comprises:
  calculating correlations among the metrics datasets, wherein each correlation, as calculated, indicates a degree to which an affine transformation accurately transforms data values from a first respective metrics dataset into data values from a second respective metrics dataset;
  selecting a subset of the correlations greater than a threshold correlation; and
  restricting the edges used in the data graph to the selected subset of the correlations.

13. The method of claim 8, wherein grouping the nodes into the clusters comprises:
  identifying a first node, a second node, a third node, and a fourth node and a set of edges among the first node, the second node, the third node, and the fourth node;
  including the first node in one of the clusters;
  including the second node in the one of the clusters based on the second node being directly connected to the first node via the set of edges and the second node being directly connected to the third node via the set of edges;
  including the third node in the one of the clusters based on the third node being directly connected to the first node via the set of edges and the third node being directly connected to the second node via the set of edges; and
  excluding the fourth node from the one of the clusters based on the fourth node lacking a direct connection via the set of edges to at least one of the first node, the second node, or the third node.

14. A system comprising:
  a processing device; and
  a non-transitory computer-readable medium communicatively coupled to the processing device,
  wherein the processing device is configured for executing program code stored in the non-transitory computer-readable medium and thereby performing operations comprising:
    accessing metrics datasets, wherein each metrics dataset includes data values for a respective metric indicating activity over a data network;
    generating, based on the metrics datasets, a data graph comprising nodes and edges, wherein each node represents a respective metric from one of the metrics datasets, wherein each edge represents a respective correlation indicating a similarity of data values in a respective pair of the metrics datasets;
    grouping the nodes into clusters based on the edges;
    determining principal component datasets for the clusters, wherein, for each cluster, each principal component dataset comprises a linear combination of a respective subset of the metrics datasets, wherein the respective subset of the metrics datasets is represented by nodes included in the cluster;
    selecting representative nodes from the data graph, wherein each representative node represents a respective metrics dataset having a highest contribution to a respective principal component dataset for a respective cluster; and
    performing an anomaly detection based on the selected representative nodes, wherein performing the anomaly detection comprises restricting the anomaly detection to metrics datasets corresponding to the selected representative nodes.

15. The system of claim 14, wherein selecting the representative nodes comprises:
  optimizing the data graph, wherein optimizing the data graph comprises:
    iteratively performing operations comprising:
      modifying the data graph by removing, from the data graph, an edge having a lowest correlation value among correlation values in the data graph,
      grouping the nodes into modified clusters based on the modified graph,
      determining modified principal component datasets for the modified clusters, wherein each modified principal component dataset is a linear combination of a respective subset of the metrics datasets that are represented by a respective subset of the nodes included in a respective modified cluster,
      calculating an output value of an objective function having a first term corresponding to a difference between (i) similarities among principal component datasets and (ii) similarities among metric datasets, the objective function also having a second term corresponding to similarities among the metrics represented in the modified graph, and
    selecting, as the optimized data graph, a version of the data graph corresponding to a minimum value of the objective function obtained from the iteratively performed operations;
  identifying principal component datasets from the optimized data graph; and
  selecting, for each identified principal component dataset, a respective metrics dataset having a respective highest contribution to the identified principal component dataset.

16. The system of claim 15, wherein a value of the first term increases in response to increases in the difference between the similarities among principal component datasets and the similarities among metric datasets,
  wherein the second term corresponds to a minimum of calculated correlations represented by edges in the modified graph and a value of the second term increases in response to the similarities among the metrics represented in the modified graph.

17. The system of claim 14, wherein generating the data graph comprises maintaining a minimum correlation among the metrics datasets included in the data graph, wherein maintaining the minimum correlation comprises:
  calculating correlations among the metrics datasets, wherein each correlation indicates a degree to which an affine transformation accurately transforms data values from a first respective metrics dataset into data values from a second respective metrics dataset;
  selecting a subset of the correlations greater than a threshold correlation; and
  restricting the edges used in the data graph to the selected subset of the correlations.

18. The system of claim 14, wherein the operations further comprise:
  determining that a representative metrics dataset includes anomalous data;
  identifying an additional metrics dataset that is grouped with the representative metrics dataset having the anomalous data; and
  outputting an indicator that additional anomalous data is included in the additional metrics dataset.

19. The system of claim 18, wherein identifying the additional metrics dataset comprises selecting, in a graph with a first node representing the representative metrics dataset and a second node representing the additional metrics dataset, the second node based on the second node having a direct-edge connection to the first node.

20. The system of claim 14, wherein grouping the nodes into the clusters based on the edges comprises:
   identifying a first node, a second node, a third node, and a fourth node and a set of edges among the first node, the second node, the third node, and the fourth node;
   including the first node in one of the one of the clusters;
   including the second node in the one of the clusters based on the second node being directly connected to the first node via the set of edges and the second node being directly connected to the third node via the set of edges;
   including the third node in the one of the clusters based on the third node being directly connected to the first node via the set of edges and the third node being directly connected to the second node via the set of edges; and
   excluding the fourth node from the one of the clusters based on the fourth node lacking a direct connection via the set of edges to at least one of the first node, the second node, or the third node.

\* \* \* \* \*